US012749471B1

(12) United States Patent
Hull et al.

(10) Patent No.: US 12,749,471 B1
(45) Date of Patent: Sep. 29, 2026

(54) APPARATUSES AND METHODS FOR DEACTIVATING SPEAKERS OF WIRELESS TRACKING DEVICES

(71) Applicant: Elevation Lab, Inc., Portland, OR (US)

(72) Inventors: Jacob Hull, Portland, OR (US); Casey Hopkins, Portland, OR (US); Mitchell T. Wilson, Portland, OR (US)

(73) Assignee: Elevation Lab, Inc., Portland, OR (US)

( * ) Notice: Subject to any disclaimer, the term of this patent is extended or adjusted under 35 U.S.C. 154(b) by 0 days.

(21) Appl. No.: 19/446,636

(22) Filed: Jan. 12, 2026

(51) Int. Cl.

| | |
|---|---|
| ***G10K 11/16*** | (2006.01) |
| ***G01S 1/04*** | (2006.01) |
| ***G10K 11/00*** | (2006.01) |
| ***H04R 1/02*** | (2006.01) |

(52) U.S. Cl.
CPC ............ *G10K 11/002* (2013.01); *G01S 1/047* (2013.01); *H04R 1/021* (2013.01); *H04R 1/026* (2013.01); *H04R 1/028* (2013.01); *H04R 2400/11* (2013.01); *H04R 2499/01* (2013.01); *H04R 2499/11* (2013.01)

(58) Field of Classification Search
CPC ....... G10K 11/002; G01S 1/047; H04R 1/021; H04R 1/026; H04R 1/028; H04R 2400/11; H04R 2499/01; H04R 2499/11
USPC .............................................................. 381/7
See application file for complete search history.

(56) References Cited

U.S. PATENT DOCUMENTS 9,560,426 B1 * 1/2017 Daniel .................... H04L 67/04
2008/0030337 A1 * 2/2008 Moskowitz ........ G06K 19/0739
340/572.3

* cited by examiner

*Primary Examiner* — Ammar T Hamid
(74) *Attorney, Agent, or Firm* — Kolitch Romano Dascenzo Gates LLP

(57) ABSTRACT

Apparatuses (10) for deactivating speakers (12) of wireless tracking devices comprise a body (16) that defines a volume (18) that is configured to at least partially receive the wireless tracking device (14) in a close-fit relationship. The apparatuses (10) further comprise or are configured to receive a piercer (20) that extends into the volume (18) to align with a critical element (22) of a speaker (12) when a wireless tracking device (14) is operatively received in the volume (18). Methods (120) comprise breaking (122) a critical element (22) of a speaker (12) of a wireless tracking device (14).

21 Claims, 20 Drawing Sheets

APPARATUSES AND METHODS FOR DEACTIVATING SPEAKERS OF WIRELESS TRACKING DEVICES

FIELD

The present disclosure relates to deactivating speakers of wireless tracking devices.

SUMMARY

Apparatuses for deactivating speakers of wireless tracking devices comprise a body and a piercer. The body defines a volume configured to at least partially receive a wireless tracking device in a close-fit relationship. In some examples, the piercer is operatively coupled to the body and extends into the volume to align with a critical element of a speaker of a wireless tracking device when the wireless tracking device is operatively received in the volume. In some examples, the body defines a passage that is aligned with the critical element of the speaker of the wireless tracking device when the wireless tracking device is operatively received in the volume. In some such examples, the piercer extends through the passage to extend into the volume to align with the critical element of the speaker. In other such examples, the passage is configured to receive the piercer, which is configured to slidingly extend through the passage and into the volume to align with the critical element of the speaker when the wireless tracking device is operatively received in the volume. Methods comprise breaking a critical element of a speaker of a wireless tracking device.

DESCRIPTION

In recent years, wireless tracking devices 14 have become popular amongst consumers. Examples of wireless tracking devices include Apple™ AirTag™, Tile™, Samsung™ Galaxy™ SmartTag™ and SmartTag2™, Chipolo™ One™, CubePro™, Orbit™, and Baseus™ branded devices. Consumers often use wireless tracking devices 14 to keep track of pets, sports equipment, electronic equipment, luggage, vehicles, etc. Wireless tracking devices 14 often are configured to make an audible sound when activated by a user via an associated mobile application. Some wireless tracking devices 14 also are configured to make an audible sound when the wireless tracking device 14 is separated from the user (i.e., from the user's mobile device running the associated mobile application) for an extended period of time. This functionality is marketed as a privacy feature to alert individuals that may be unknowingly carrying a wireless tracking device 14. However, this functionality can cause significant distress to a pet carrying a wireless tracking device 14 when the wireless tracking device 14 emits an audible sound merely because the pet owner is separated from the pet, such as when traveling for work, on vacation, etc.

Figure 1:
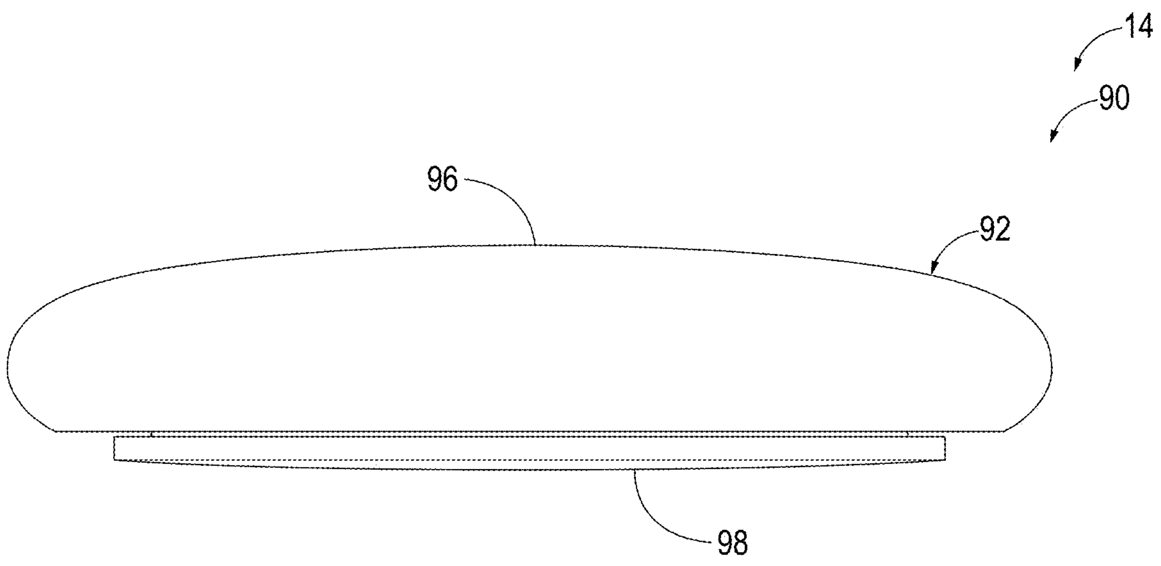
FIG. 1 is a side view of an Apple™ AirTag™ device.
Figure 2:
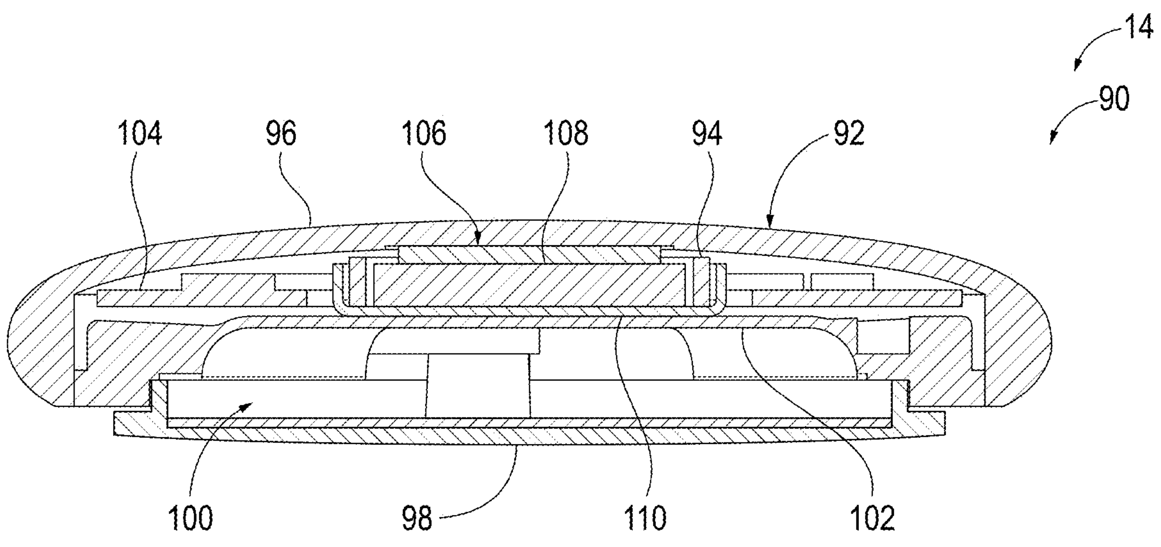
FIG. 2 is a schematic cross-sectional side view of the Apple™ AirTag™ device of FIG. 1.

FIGS. 1 and 2 illustrate an example wireless tracking device 14 in the form of an Apple™ AirTag™ device 90. As seen in the cross-sectional view of FIG. 2, Apple™ AirTag™ devices comprise a housing 92 including an outer shell 96 and a battery cover 98 that collectively define a battery compartment 100 for receipt of a coin cell battery. The housing 92 further comprises an inner wall 102 that at least partially defines the battery compartment 100 together with the battery cover 98. The Apple™ AirTag™ device 90 further comprises a circuit board 104 and a speaker 106 supported between the inner wall 102 and the outer shell 96. The speaker 106 comprises a magnet 108, a speaker coil 94 extending circumferentially around the magnet 108, and a protective cover 110 extending between the across the magnet 108 and wrapped around the speaker coil 94 and engaged with the inner wall 102. The speaker coil 94 of the speaker 106 of the Apple™ AirTag™ device 90 may be described as a critical element of the speaker 106, because if the speaker coil 94 is severed, the speaker 106 will no longer function.

Figure 3:
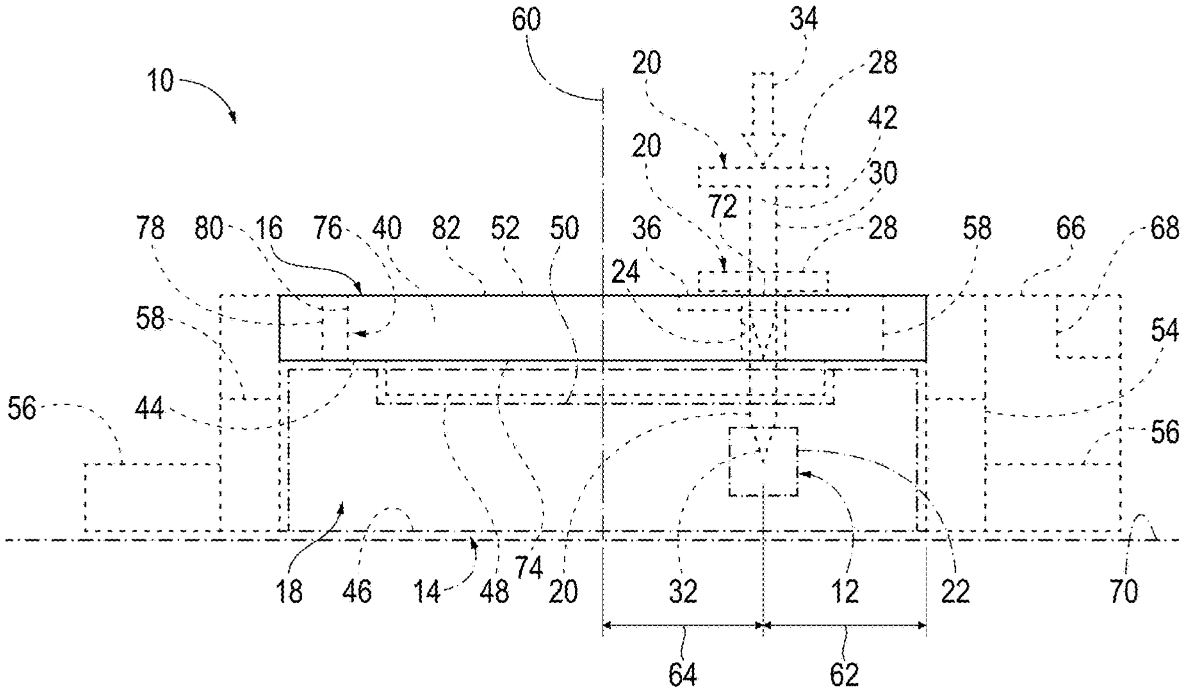
FIG. 3 is a schematic illustration representing apparatuses according to the present disclosure.

Apparatuses 10 for deactivating speakers 12 of wireless tracking devices 14 are disclosed herein and are schematically represented in FIG. 3. Some apparatuses 10 are configured specifically for use with Apple™ AirTag™ devices 90 discussed above; however, apparatuses 10 may be configured for use with any suitable wireless tracking devices 14. Generally, in FIG. 3, elements that are likely to be included in a given example are illustrated in solid lines, while elements that are optional to a given example or that correspond to one or more specific examples are illustrated in broken lines. However, elements that are illustrated in solid lines are not essential to all examples of the present disclosure, and an element shown in solid lines may be omitted from a particular example without departing from the scope of the present disclosure.

As schematically represented in FIG. 3, apparatuses 10 comprise at least a body 16 that is configured to engage a wireless tracking device 14 for deactivating the speaker 12 thereof.

In some examples of apparatuses 10, the body 16 defines a volume 18 that is configured to at least partially receive a wireless tracking device 14 in a close-fit relationship. By a "close-fit relationship," it is meant that portions of the body 16 that define the volume 18 will either engage the wireless tracking device 14 when operatively positioned within the volume 18 or will be within 1 or 2 millimeters (mm) from engagement with the wireless tracking device 14 when operatively positioned within the volume 18. Accordingly, when a wireless tracking device 14 is operatively positioned within the volume 18, the wireless tracking device 14 will not readily move or will only very minimally move relative to the body 16. In some examples, the body 16 and/or the volume 18 may be described as being configured to receive a wireless tracking device 14 in a friction-fit relationship or in a snap-fit relationship. In some such examples, the volume 18 may be described as having a profile that corresponds with a profile of a specific configuration of wireless tracking device 14. For example, the volume 18 may have a circular profile when an apparatus 10 is configured for use with an Apple™ AirTag™ device, a rectangular or rounded rectangular profile when an apparatus 10 is configured for use with a Tile™ device, or an oblong profile when an apparatus 10 is configured for use with a Samsung™ Galaxy™ SmartTag™ device, etc. Other shapes of profiles of volume 18 also may be used depending on the specific configuration of wireless tracking devices 14 with which an apparatus 10 is configured for use.

In particular, apparatuses 10 whose body 16 defines a volume 18 that is configured to operatively receive a wireless tracking device 14 so that the wireless tracking device 14 may be immobilized in such a way that a speaker 12 of the wireless tracking device 14 may be deactivated. Accordingly, such apparatuses 10 additionally or alternatively may be described as or referred to as jigs or holders for wireless tracking devices 14. In some examples such as schematically represented in FIG. 3, apparatuses 10 are configured to retain a wireless tracking device 14 against a surface 70, such as a table top, a counter, a floor, an anvil, a workbench, or the like. In other examples, the body 16 may fully enclose a wireless tracking device 14, without necessarily the need to retain the wireless tracking device 14 against a surface 70.

Some examples of apparatuses 10 further comprise a piercer 20 that is configured or otherwise capable of directly or indirectly damaging a critical element 22 of a speaker 12 of a wireless tracking device 14. Piercers 20 additionally or alternatively may be described as or referred to as elongate tools, spikes, tacks, skewers, projections, tines, pins, pitons, pegs, stakes, posts, and the like. In some examples, the piercer 20 is operatively coupled to the body 16 of the apparatus 10 and may be described as an integral piercer 20.

In other examples, the piercer 20 is separate from the body 16 but is configured to be coupled to or otherwise used with the body 16 to directly or indirectly damage the critical element 22 of the speaker 12. In such examples, the piercer 20 may be described as a separate piercer 20. In some examples, the piercer 20 is an off-the-shelf structure that an end user provides for use with the apparatus 10. For example, such a separate piercer 20 may be a tack, a thumb tack, a nail, a drill bit, a threaded fastener, a screw, or other elongate structure that is capable of directly or indirectly damaging a critical element 22 of the speaker 12 of a wireless tracking device 14. As discussed above in connection with the example wireless tracking device 14 in the form of an Apple™ AirTag™ device 90, an example of a critical element 22 of a speaker 12 of a wireless tracking device 14 is a speaker coil 94. Accordingly, a piercer 20, and thus an apparatus 10, may be configured to directly or indirectly damage the speaker coil 94 of a speaker 12 of a wireless tracking device 14. However, critical elements 22 are not limited to speaker coils. By "indirectly damaging the critical element 22," it is meant that the piercer 20 may not physically engage the critical element 22, but instead may cause a separate component of the wireless tracking device 14 to physically engage and damage the critical element 22. For example, in connection with an Apple™ AirTag™ device 90, the piercer 20 may pierce the inner wall 102 and then directly engage the protective cover 110, causing the protective cover 110 to engage and damage the speaker coil 94.

As schematically represented in FIG. 3, in some examples of apparatuses 10, the body 16 defines a passage 24 that is aligned with a critical element 22 of a speaker 12 when a wireless tracking device 14 is operatively received in the volume 18. In such examples of apparatuses 10 that comprise an integral piercer 20, the piercer 20 extends through the passage 24 and into the volume 18 to align with the critical element 22 of the speaker 12 when the wireless tracking device 14 is operatively received in the volume 18. In such examples of apparatuses 10 that comprise a separate piercer 20 or that are configured to be used with a separate piercer 20, the passage 24 is configured to receive the piercer 20, such that the separate piercer 20 slidingly extends through the passage 24 and into the volume 18 to align with a critical element 22 of a speaker 12 when a wireless tracking device 14 is operatively received in the volume 18.

In some examples, the passage 24 is sized to create a friction-fit relationship between the body 16 and the piercer 20, such that the piercer 20 is retained to the body 16 and is restricted from freely falling out of the passage 24, such that the piercer could be easily lost or misplaced separate and apart from the body 16. In some such examples, the body 16 may be made of a flexible material such as a silicone rubber with the passage's nominal diameter being smaller than the outer diameter of the portion of the piercer 20 that extends through the passage 24. Accordingly in such examples, the passage 24 effectively grips the piercer 20 and restricts the piercer 20 from freely falling out of the passage 24.

In other examples, rather than the passage 24 and/or the piercer 20 being directly aligned with a critical element 22 of a speaker 12 when a wireless tracking device 14 is operatively received in the volume 18, the passage 24 and/or the piercer 20 may be aligned with a non-critical element that when physically and operatively engaged by the piercer 20 still results in the critical element 22 being damaged. For example, the protective cover 110 of an Apple™ AirTag™ device 90 may be a non-critical element that, when operatively engaged by the piercer 20, will damage a critical element 22, such as the speaker coil 94, of the Apple™ AirTag™ device 90.

As schematically represented in FIG. 3, in some examples, the piercer 20 comprises a head 28 and an elongate shaft 30 that has a terminal end 32 opposite the head 28. In such examples, the head 28 is configured to receive an impact force 34 to cause the terminal end 32 to damage a critical element 22 of a speaker 12 when a wireless tracking device 14 is operatively received in the volume 18. In some examples, the body 16 of the apparatus 10 is constructed of a body material 40, and the piercer 20 is constructed of a piercer material 42 that is harder than the body material 40. Accordingly in such examples, when the piercer 20 receives an impact force 34 (e.g., via a hammer or other blunt object), the piercer 20 will directly or indirectly damage a critical element 22 of a speaker 12 of a wireless tracking device 14 without the body 16 necessarily damaging a remainder of the wireless tracking device 14. That is, the materials of the body 16 and the piercer 20 may be selected so that only the critical element 22 is critically damaged when the piercer 20 receives an impact force 34. As examples, the piercer 20 may be constructed of a metal, such as a hardened metal, and the body 16 may be constructed of a plastic or of a flexible material, such as a silicone rubber.

Depending on the configuration of the wireless tracking device 14 used with an apparatus 10, the terminal end 32 of the piercer 20 also may be configured to pierce a portion of the wireless tracking device 14 to then critically damage a critical element 22 of a speaker 12 of a wireless tracking device 14. That is, the impact force 34 may cause the piercer 20 to first penetrate an outer structure (e.g., the housing) of a wireless tracking device 14 before then critically damaging a critical element 22 of a speaker 12 of the wireless tracking device 14. In some examples, the terminal end 32 of the piercer 20 is sharp or pointed. In the example of an Apple™ AirTag™ device 90, as discussed above, the piercer 20 may be configured to first pierce the outer shell 96 or the inner wall 102 of the housing 92 and the protective cover 110 of the Apple™ AirTag™ device 90 before critically damaging the speaker coil 94 of the Apple™ AirTag™ device 90.

In examples of apparatus 10 with an integral piercer 20, the piercer 20 extends into the volume 18 or is configured to extend into the volume 18, to align with a critical element 22 of a speaker 12 of a wireless tracking device 14 and/or to align with a non-critical element that is positioned to critically damage the critical element 22 of the speaker 12 of the wireless tracking device 14 when the wireless tracking device 14 is operatively received in the volume 18.

In some such examples, the piercer 20 is fixed relative to the volume 18, such that the piercer 20 always extends into the volume 18. That is, in such examples, the piercer 20 is not configured to translate or otherwise move relative to the body 16 of the apparatus. Accordingly, in such examples, when a wireless tracking device 14 is initially received in the volume 18, the piercer 20 (e.g., the terminal end 32 thereof) will engage an outer surface of the wireless tracking device 14. When an impact force 34 is applied, the entirety of the apparatus 10 (i.e., the body 16 and the piercer 20) will translate relative to the wireless tracking device 14, with the wireless tracking device 14 moving further into the volume 18 and with the piercer 20 piercing an outer structure of the wireless tracking device 14 to then directly or indirectly critically damage a critical element 22 of a speaker 12 of the wireless tracking device 14.

In some such examples where the piercer 20 is fixed relative to the volume 18, rather than the piercer 20 comprising a head 28 for receiving an impact force 34, instead the body 16 may comprise an impact zone 36 that is aligned with a critical element 22 of a speaker 12 and/or with a non-critical element that is positioned to critically damage the critical element 22 of the speaker 12 when a wireless tracking device 14 is operatively received in the volume 18. Such an impact zone 36 is configured to receive an impact force 34 to cause the piercer 20 to directly or indirectly damage a critical element 22 of a speaker 12 when a wireless tracking device 14 is operatively received in the volume 18. In some such examples, the impact zone 36 is defined by indicia, such as a distinct color from a remainder of the body 16 or merely by a circle or other shape enclosing or otherwise designating the impact zone 36 to convey to a user where to impact the body 16 to cause the piercer 20 to directly or indirectly critically damage a critical element 22 of a speaker 12 of a wireless tracking device 14 received in the volume 18. In some examples, the impact zone 36 is defined by a distinct material from a remainder of the body 16. In some such examples, the distinct material may be harder than the remainder of the body 16. For example, the distinct material of the impact zone 36 may be a metal, while the remainder of the body 16 may be constructed of a plastic or of a flexible material, such as a silicone rubber.

In examples where the piercer 20 is fixed relative to the body 16 and the volume 18, the piercer 20 may be adhered to the body 16, such as within a passage 24 and/or between the head 28 of the piercer 20 and the body 16. By being fixed to the body 16, the piercer 20 cannot be separated from the body 16 and thus will not be misplaced or lost by a user.

In other examples of apparatuses 10, the piercer 20 is not fixed relative to the body 16 or the volume 18. For example, in apparatuses 10 whose body 16 defines a passage 24 and the piercer 20 extends through the passage 24, the piercer 20 may be slidingly received in the passage 24. Accordingly, when a wireless tracking device 14 is operatively received in the volume 18, the piercer 20 may not initially extend into the volume 18 or may extend only minimally into the volume 18. Then, upon receipt of an impact force 34, the piercer 20 will translate into or further into the volume 18, such that it will critically damage a critical element 22 of a speaker 12 of the wireless tracking device 14 that is received in the volume 18, including optionally piercing a portion of the wireless tracking device 14, as discussed above.

In examples where the piercer 20 is permitted to slide or otherwise translate relative to the body 16 and the volume 18, the piercer 20 therefore does not restrict full receipt of a wireless tracking device 14 within the volume 18. As a result, the apparatus 10 and the wireless tracking device 14 can easily be retained against a surface 70 without the body 16 or the wireless tracking device 14 moving while a user applies an impact force 34 to the piercer 20. Such a configuration results in a very stable apparatus in contrast to examples where the piercer 20 is fixed relative to the body 16 and thus the entirety of the apparatus must translate with piercer 20 upon receipt of an impact force 34.

In some such examples, while not being fixed relative to the body 16, the piercer 20 may be restricted from being separated from the body 16. For example, a piercer 20 may have an enlarged portion along its shaft 30 that is retained within a widened portion of a passage 24, permitting the piercer to slide relative to the body 16 while restricting the piercer 20 from being removed from the passage 24. By having the piercer 20 restricted from being separated from the body 16, the piercer is less likely to become lost or misplaced by a user.

With continued reference to FIG. 3, in some examples, the volume 18 has an at least partially closed top side 44 and an open bottom side 46 that is opposite the at least partially closed top side 44. In such examples, the body 16 may be described as comprising a top wall 52 that defines the at least partially closed top side 44 of the volume 18 and a sidewall 54 that extends between the top wall 52 and the open bottom side 46 of the volume 18. The volume 18 is configured to at least partially receive a wireless tracking device 14 via the open bottom side 46.

In some such examples, the body 16 defines a projection 48 that defines at least a portion of the at least partially closed top side 44. When present, the projection 48 is configured to extend into a cavity 50, such as a battery compartment or other depression, of a wireless tracking device 14 when the wireless tracking device 14 is operatively received in the volume 18. The projection 48 aids in securing a wireless tracking device 14 within the volume 18. Specifically, the projection 48 is sized to engage internal surfaces of the cavity 50. In some examples, the projection 48 is configured to substantially fill a cavity 50 of a wireless tracking device 14 when the wireless tracking device 14 is operatively received in the volume 18. In some examples, the projection 48 may be described as disc-shaped, in so far as it may have a diameter or greatest width that is larger than its height or thickness.

In some examples, as schematically represented in FIG. 3, the piercer 20 extends from the projection 48 into the volume 18. In some such examples where the apparatus 10 defines a passage 24 in the body 16, the passage 24 extends through the projection 48. Accordingly in these examples, not only does the projection 48 aid in securing a wireless tracking device 14 in place, but also the projection reduces a length of the piercer 20 needing to extend beyond the body 16, thereby reducing the likelihood that the piercer 20 will bend or otherwise become damaged during use.

Apparatuses 10 may comprise one or more features to aid a user to engage the body 16 of an apparatus 10 during use. For example, with continued reference to FIG. 3, in some examples, the body 16 comprises one or more flanges 56 that extend from the sidewall 54, away from the volume 18 and adjacent to the open bottom side 46 of the volume 18. Such flange(s) 56 provide structure for a user to urge the body 16 against a surface 70 and further provide a position away from the head 28 of the piercer 20 or away from the impact zone 36 of the body 16 for placement of a user's fingers when urging the body 16 toward a surface 70.

Additionally or alternatively, as also schematically represented in FIG. 3, in some examples, the body 16 comprises an extension 66 that extends away from the sidewall 54 opposite the volume 18. When present, this extension 66, similar to the flange(s) 56, provides structure for a user to engage and urge the body 16 against a surface 70, while positioning the user's fingers away from the head 28 of the piercer 20 or away from the impact zone 36 of the body 16. While the flange(s) 56 may be thinner or shorter than the remainder of the body 16, the extension 66 may be the same thickness or height as the remainder of the body 16. In some examples, the extension 66 is hollow. In some examples, the extension 66 may have a width that coincides with the remainder of the body 16, while in other examples, the extension 66 may be wider or less wide than the remainder of the body 16.

In some examples, the extension 66 defines one or more finger depressions 68 that are configured to receive one or more respective fingers of a user to engage and urge the body 16 against a surface 70.

With continued reference to FIG. 3, in some examples, the body 16 defines one or more openings 58 in the top wall 52 and/or in the sidewall 54. When present, the opening(s) 58 may be sized to receive a user's finger to engage a wireless tracking device 14 when the wireless tracking device 14 is operatively received in the volume 18, such as to urge the wireless tracking device 14 out of the volume 18 after the piercer 20 has critically damaged a critical element 22 of a speaker 12 of the wireless tracking device 14.

Because apparatuses 10 are specifically configured to facilitate a user damaging a critical element 22 of a speaker 12 of a wireless tracking device 14, the location of the piercer 20 and specifically the terminal end 32 thereof relative to the body 16 may be critical, not only to ensure damage of the critical element 22, but also to ensure that other critical elements of the wireless tracking device 14 are not damaged. To this end, as schematically represented in FIG. 3, the location of the terminal end 32 relative to the sidewall 54 and/or relative to a central axis 60 of the volume 18 may be critical. In the non-exclusive example of a wireless tracking device 14 in the form of an Apple™ AirTag™ device 90, a closest distance 62 between the sidewall 54 and the terminal end 32 of the piercer 20 may be in the range of 10.3-11.3 millimeters (mm), at least when the terminal end 32 is operatively positioned to damage a critical element 22 of a speaker 12 when an Apple™ AirTag™ device 90 is operatively received in the volume 18. Additionally or alternatively, a closest distance 64 between the central axis 60 and the terminal end 32 of the piercer 20 may be in the range of 4.8-5.5 millimeters (mm) when the terminal end 32 is operatively positioned to damage a critical element 22 of a speaker 12 when an Apple™ AirTag™ device 90 is operatively received in the volume 18.

With continued reference to FIG. 3, rather than the body 16 defining a volume 18 for receiving a wireless tracking device 14, the body 16 may simply be configured to operatively engage a surface of a wireless tracking device 14 for operative alignment of a piercer 20 with a critical element 22 of a speaker 12. For example, in some such examples, the body 16 comprises piercing indicia 72 that is positioned to align with a critical element 22 of the speaker 12 when the body 16 is operatively engaged with the wireless tracking device 14. Examples of piercing indicia 72 include an X or a circle. In other examples, the body 16 defines a passage 24 that is positioned to align with the critical element 22 of the speaker 12 when the body 16 is operatively engaged with the wireless tracking device 14.

In some such examples, the body 16 is configured to adhere to the wireless tracking device 14. For example, the body 16 may comprise an adhesive 74 and may be described as a sticker. In some examples, the body 16 is constructed of a film material. In some such examples, the body 16 is constructed of a static film material, such as a vinyl or polyester film material. Additionally or alternatively, the body 16 may be constructed of paper, paperboard, plastic, or metal, with or without an adhesive or other structure for attaching the body 16 to a wireless tracking device 14. Such apparatuses 10 may be described as jigs, stencils, or templates for operatively aligning the piercing indicia 72 or the passage 24 with the wireless tracking device 14 to enable a user to utilize a piercer 20 to damage a critical element 22 of a speaker 12 of the wireless tracking device 14.

In some examples, the body 16 is configured to operatively engage a wireless tracking device 14 within a cavity 50 of the wireless tracking device 14, such as within a battery compartment of the wireless tracking device.

In some examples as schematically represented in FIG. 3, the body 16 defines one or more alignment features 76 that are configured to operatively align the body 16 with a wireless tracking device 14 so that the piercing indicia 72 or the passage 24 is operatively aligned with the critical element 22 of the speaker 12 when the body 16 is operatively engaged with the wireless tracking device 14. For example, the alignment feature(s) 76 may be configured to be aligned with specific structure of a wireless tracking device 14, such as a corner, an edge, a fastener, a thread, indicia, a battery terminal, etc. of the wireless tracking device 14.

In some such examples as schematically represented in FIG. 3, the alignment feature(s) 76 comprise one or more recesses 78, one or more holes 80, and/or one or more alignment indicia 82.

In some examples, the body 16 has a central axis 60, and a closest distance 64 between the central axis 60 and a center of the piercing indicia 72 or a center of the passage 24 is 4.8-5.5 millimeters.

Figure 4:
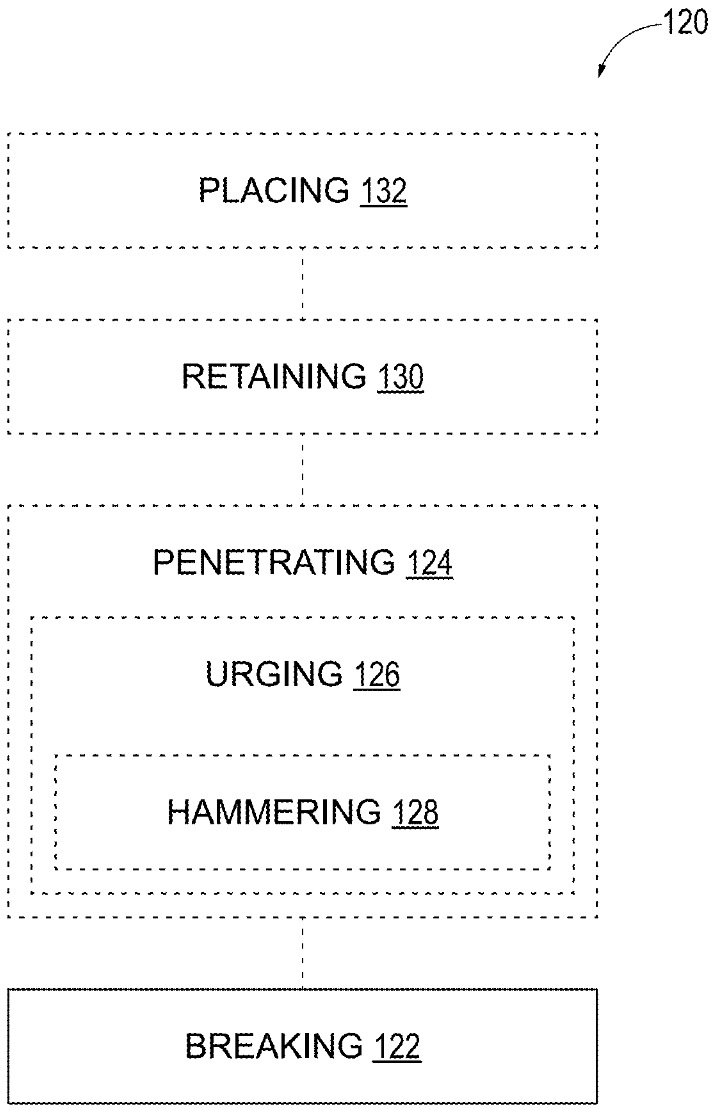
FIG. 4 is a flowchart schematically representing methods according to the present disclosure.
Figure 5:
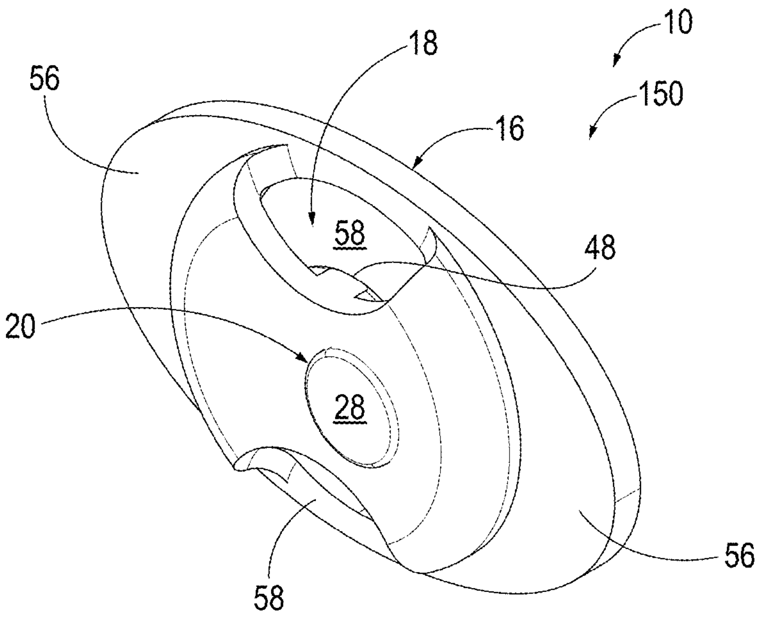
FIG. 5 a top isometric view of an example apparatus according to the present disclosure.
Figure 6:
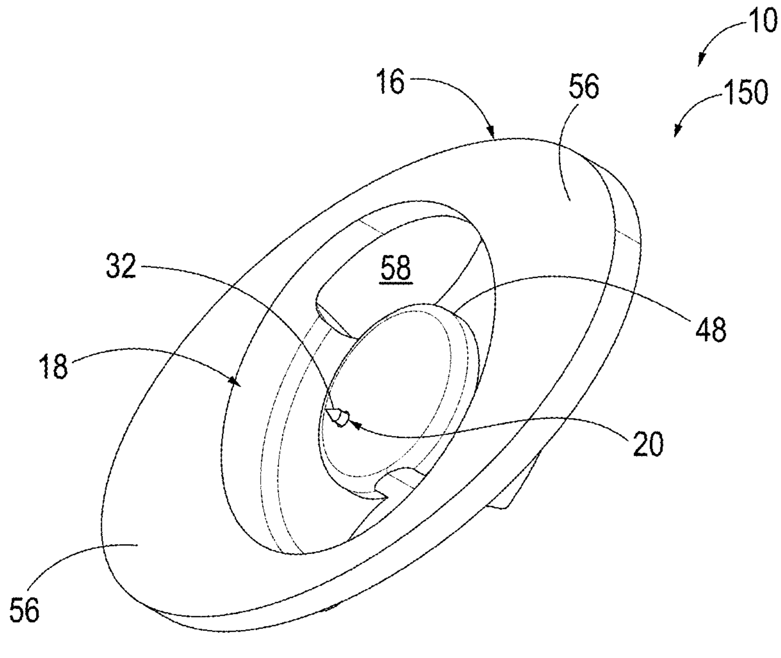
FIG. 6 is a bottom isometric view of the example apparatus of FIG. 5.
Figure 7:
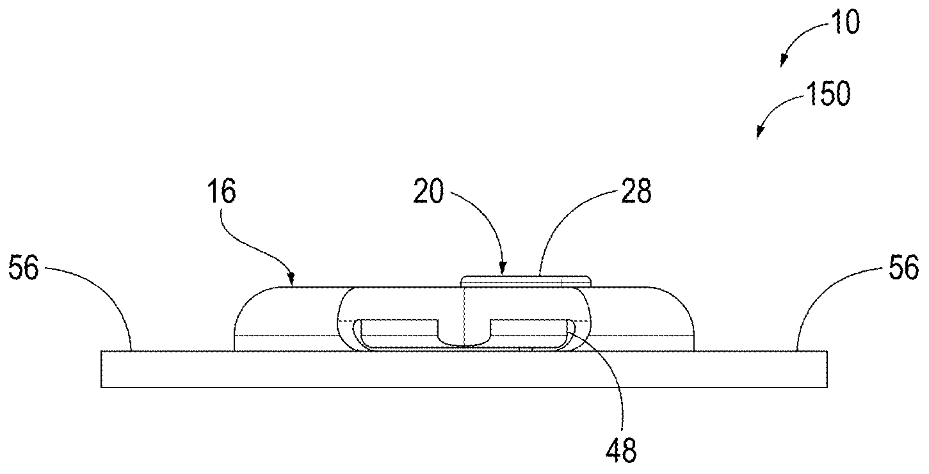
FIG. 7 is a front view of the example apparatus of FIG. 5.
Figure 8:
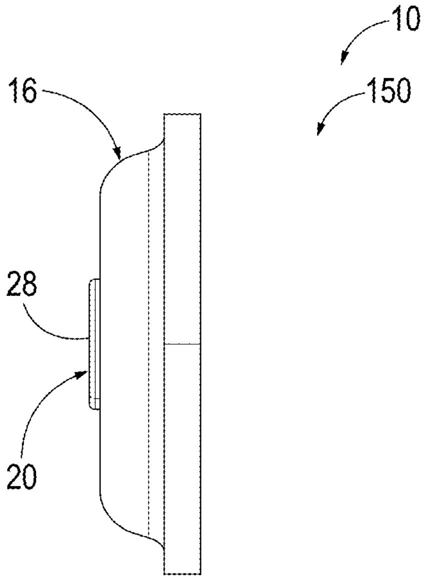
FIG. 8 is a side view of the example apparatus of FIG. 5.
Figure 9:
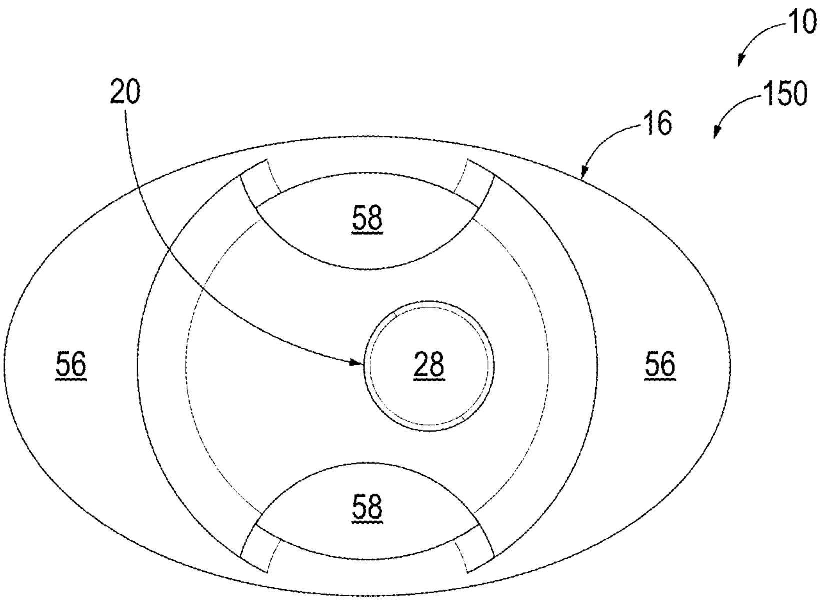
FIG. 9 is a top view of the example apparatus of FIG. 5.
Figure 10:
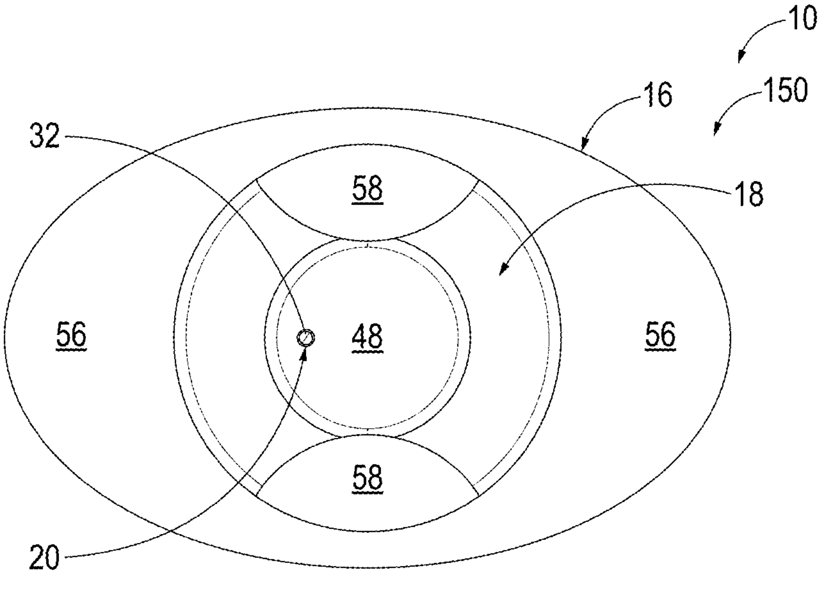
FIG. 10 is a bottom view of the example apparatus of FIG. 5.

Some apparatuses 10 further comprise a piercer 20 that is configured to pierce the wireless tracking device 14 through the piercing indicia 72 or through the passage 24. Alternatively, as discussed herein, in some examples, the piercer 20 is an off-the-shelf structure that an end user provides for use with the apparatus 10. For example, such a separate piercer 20 may be a tack, a thumb tack, a nail, a drill bit, a threaded fastener, a screw, or other elongate structure that is capable of directly or indirectly damaging a critical element 22 of the speaker 12 of a wireless tracking device 14. FIG. 4 schematically provides a flowchart that represents illustrative, non-exclusive examples of methods according to the present disclosure. In FIG. 4, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 4 are not limiting and other methods and steps are within the scope of the present disclosure, including methods having greater than or fewer than the number of steps illustrated, as understood from the discussions herein.

As schematically represented in FIG. 4, methods 120 typically comprise at least breaking 122 a critical element 22 of a speaker 12 of a wireless tracking device 14. Some methods 120 further comprise penetrating 124 a housing 92 of a wireless tracking device 14, with the penetrating 124 resulting in the breaking 122. In some such examples, the penetrating 124 comprises urging 126 a piercer 20 through the housing 92. In some such examples, the urging 126 comprises hammering 128 the piercer 20.

In some examples of methods 120, the critical element 22 of the speaker 12 is a speaker coil 94.

As schematically represented in FIG. 4, some examples of methods 120 further comprise retaining 130 the wireless tracking device 14 while performing the breaking 122. In some such examples, the retaining 130 is performed concurrently with the penetrating 124. In some examples, the retaining 130 is performed with an apparatus 10 according to the present disclosure. However, methods 120 may use other structures other than an apparatus 10 to operatively align a piercer-like object with a wireless tracking device 14 to critically damage a critical element 22 of a speaker 12 of the wireless tracking device 14. Other methods 120 may simply utilize a piercer-like object without using something equivalent to the body 16 of an apparatus 10 or other alignment structure. That is, within the scope of methods 120 are methods that merely comprise a user urging a piercer (e.g., a tack, a thumb tack, a nail, a drill bit, a threaded fastener, a screw, or other elongate sharp object) into a wireless tracking device 14 to critically damage a speaker 12 thereof.

Turning now to FIGS. 5-35, illustrative non-exclusive examples of apparatuses 10 in the form of apparatuses 150, 160, 170, 180, and 190 are illustrated. Where appropriate, the reference numerals from the schematic illustrations of FIG. 3 are used to designate corresponding parts of apparatuses 150, 160, 170, 180, and 190; however, the examples of FIGS. 5-35 are non-exclusive and do not limit apparatuses 10 to the illustrated embodiments of apparatuses 150, 160, 170, 180, and 190. That is, apparatuses 10 are not limited to the specific embodiments of the illustrated apparatuses 150, 160, 170, 180, and 190, and apparatuses 10 may incorporate any number of the various aspects, configurations, characteristics, properties, etc. of apparatuses 10 that are illustrated in and discussed with reference to the schematic representation of FIG. 3 and/or the embodiments of FIGS. 5-35, as well as variations thereof, without requiring the inclusion of all such aspects, configurations, characteristics, properties, etc. For the purpose of brevity, each previously discussed component, part, portion, aspect, region, etc., or variants thereof may not be discussed, illustrated, and/or labeled again with respect to apparatuses 150, 160, 170, 180, and 190; however, it is within the scope of the present disclosure that the previously discussed features, variants, etc. may be utilized with apparatuses 150, 160, 170, 180, and 190.

The example apparatuses 10 of FIGS. 5-32 are examples of apparatuses 10 whose body 16 defines a volume 18 for operatively receiving a wireless tracking device 14 in a close-fit relationship.

Figure 11:
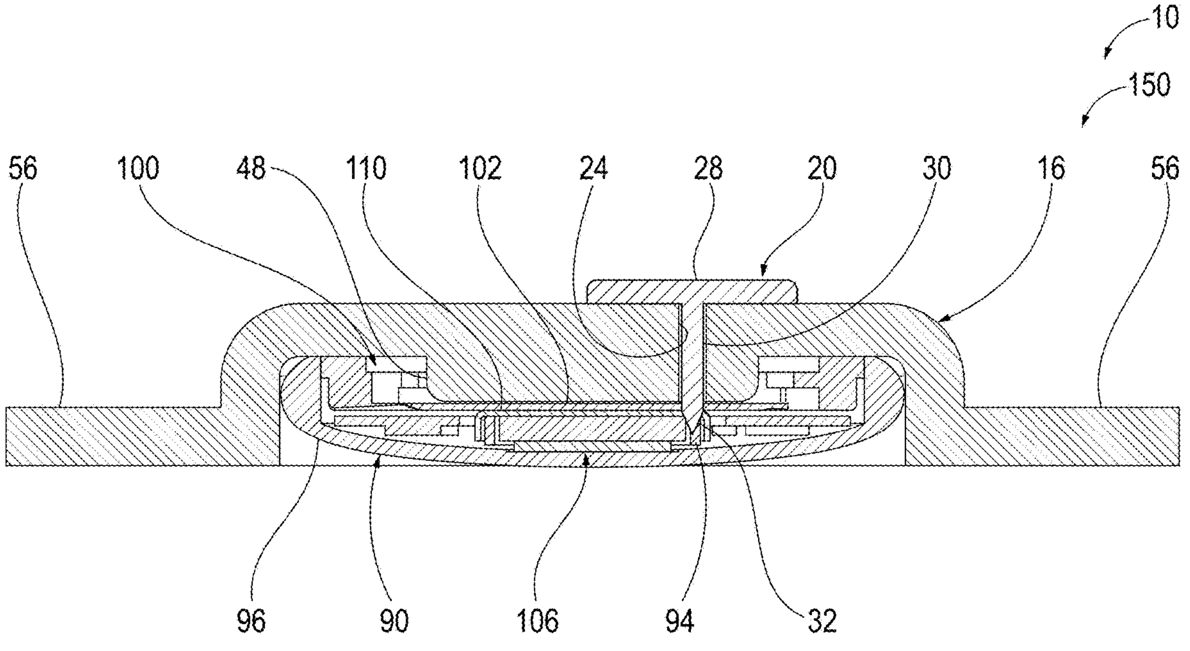
FIG. 11 is a cross-sectional side view of the example apparatus of FIG. 5, together with an Apple™ AirTag™ device operatively received in the volume of the apparatus.
Figure 12:
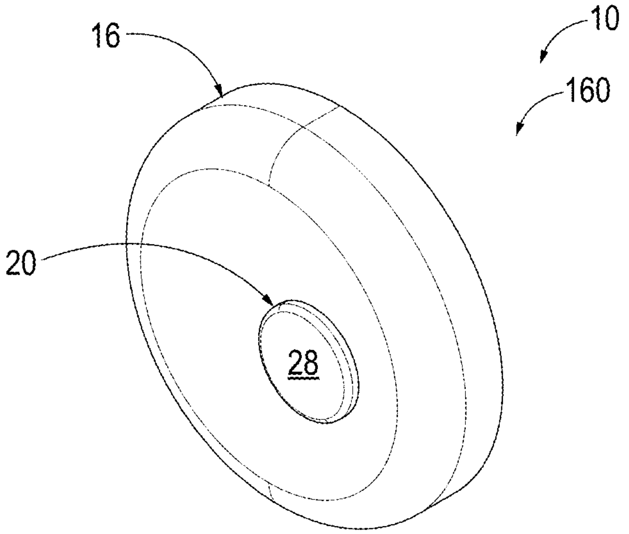
FIG. 12 a top isometric view of another example apparatus according to the present disclosure.
Figure 13:
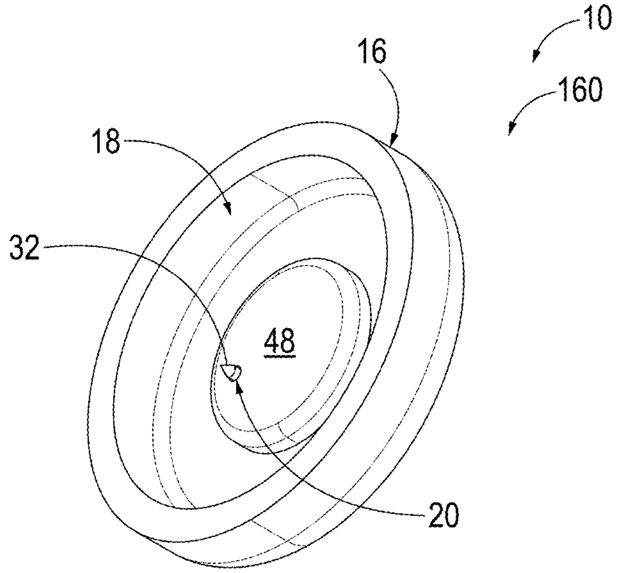
FIG. 13 is a bottom isometric view of the example apparatus of FIG. 12.
Figure 14:
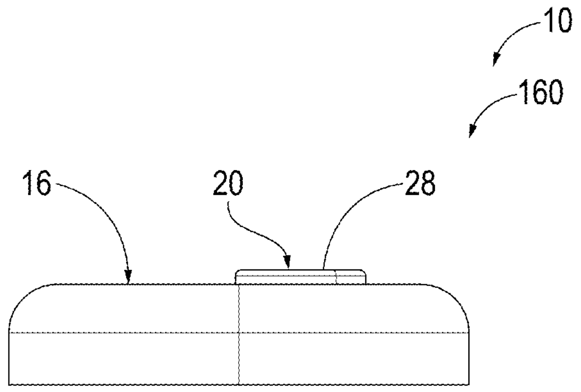
FIG. 14 is a front view of the example apparatus of FIG. 12.
Figure 15:
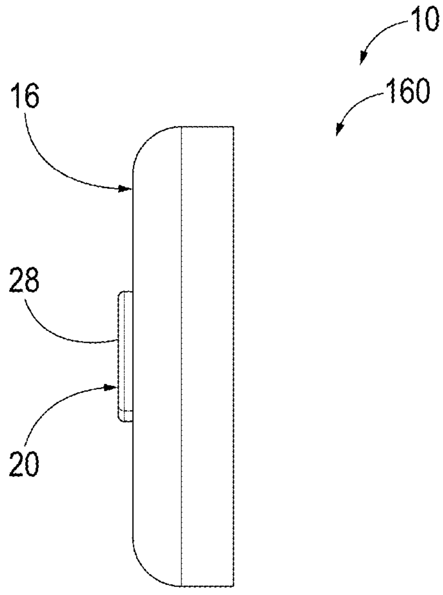
FIG. 15 is a side view of the example apparatus of FIG. 12.
Figure 16:
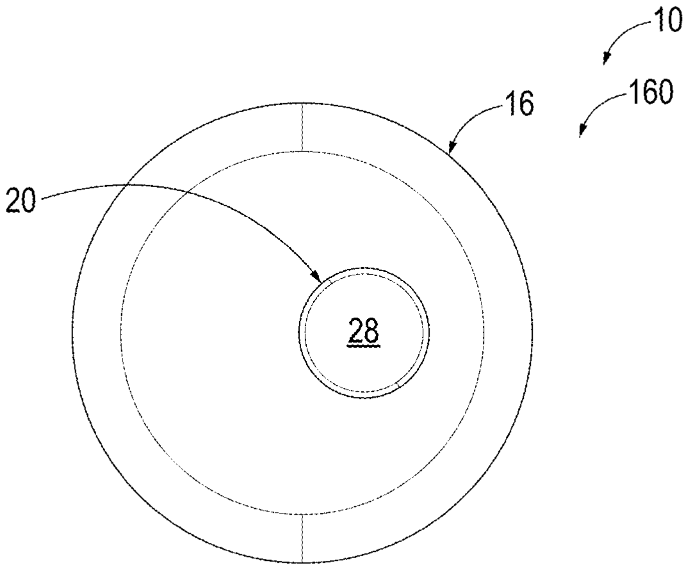
FIG. 16 is a top view of the example apparatus of FIG. 12.
Figure 17:
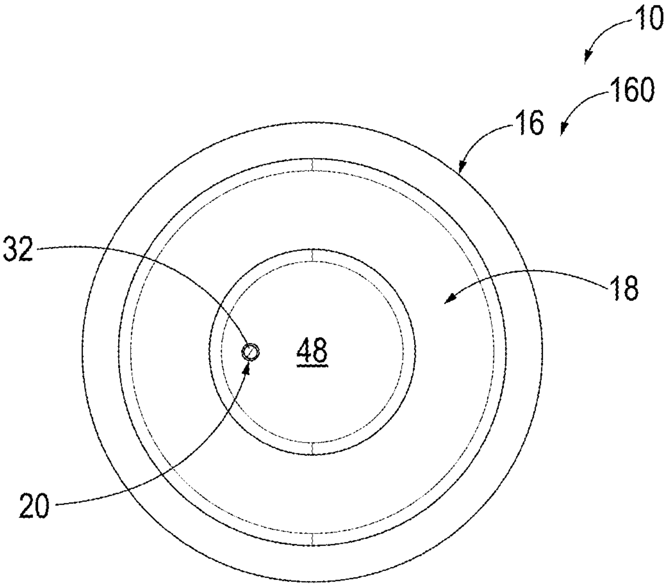
FIG. 17 is a bottom view of the example apparatus of FIG. 12.

FIGS. 5-11 illustrate example apparatus 150. Apparatus 150 is an example of an apparatus 10 that is configured for use with an Apple™ AirTag™ device 90. As seen in FIGS. 5-11, apparatus 150 is an example of an apparatus 10 whose body 16 comprises flanges 56 and defines openings 58. The body 16 of apparatus 150 also comprises a projection 48 for extending into the battery compartment 100 of an Apple™ AirTag™ device 90. The body 16 of apparatus 150 defines a passage 24 that extends through the projection 48. The piercer 20 of apparatus 150 comprises a head 28 and an elongate shaft 30 that extends through the passage 24. As seen in FIG. 11, the terminal end 32 of the piercer 20 is positioned to pierce the inner wall 102 and the protective cover 110 of the Apple™ AirTag™ device 90 and to critically damage the speaker coil 94 of the speaker 106 of the Apple™ AirTag™ device 90.

Figure 18:
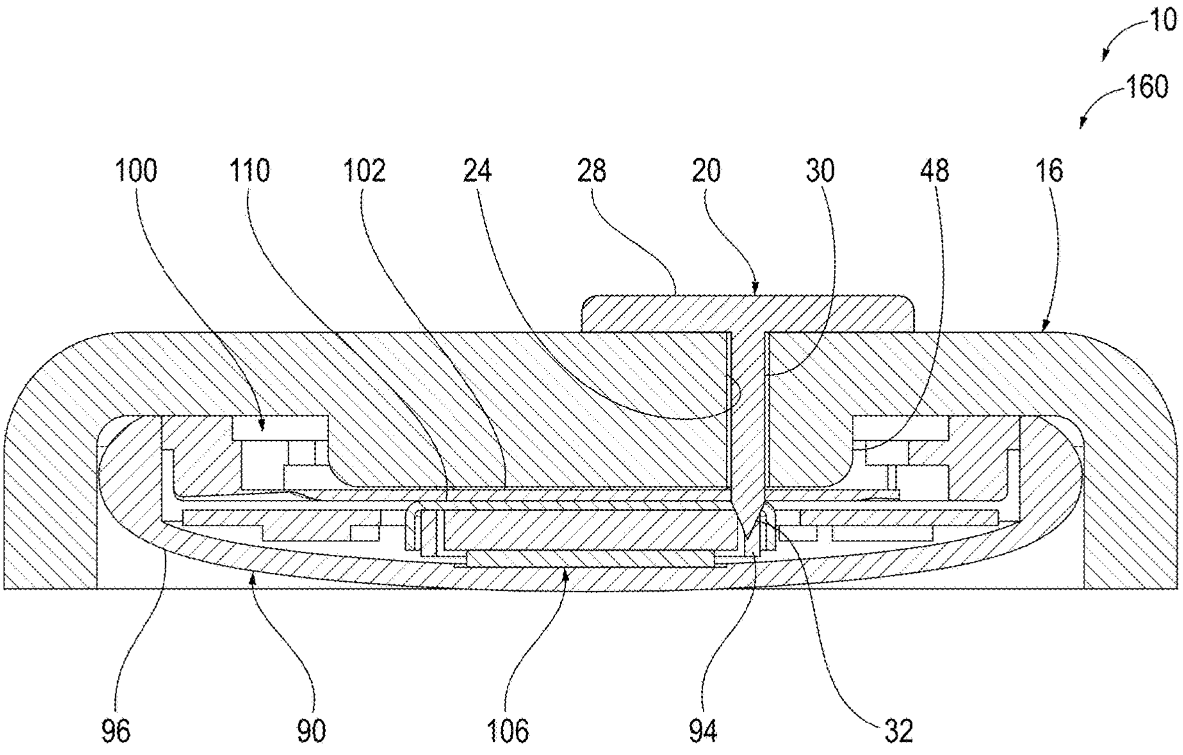
FIG. 18 is a cross-sectional side view of the example apparatus of FIG. 12, together with an Apple™ AirTag™ device operatively received in the volume of the apparatus.
Figure 19:
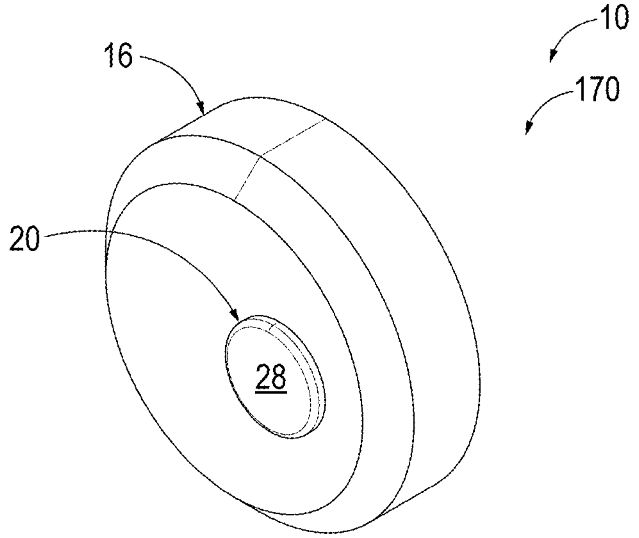
FIG. 19 a top isometric view of another example apparatus according to the present disclosure.
Figure 20:
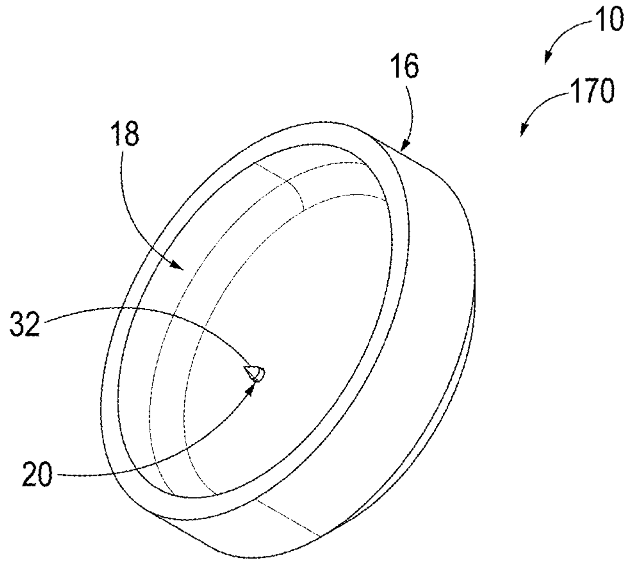
FIG. 20 is a bottom isometric view of the example apparatus of FIG. 19.
Figure 21:
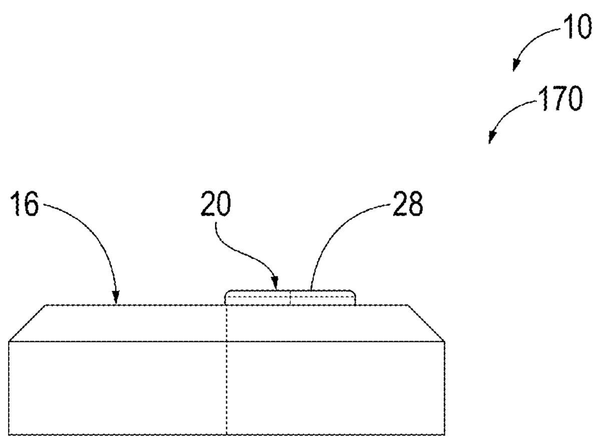
FIG. 21 is a front view of the example apparatus of FIG. 19.
Figure 22:
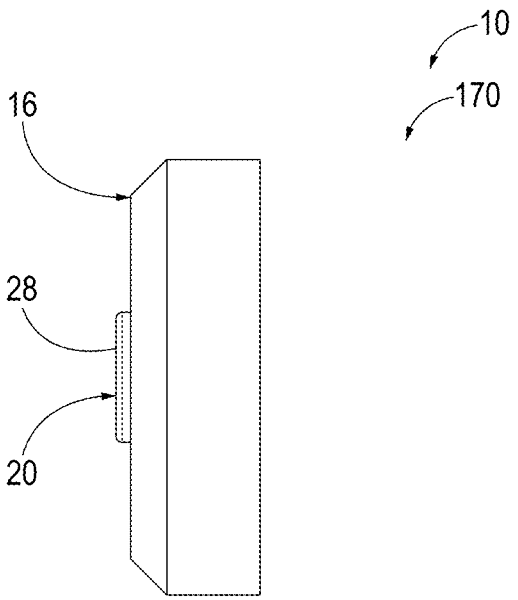
FIG. 22 is a side view of the example apparatus of FIG. 19.
Figure 23:
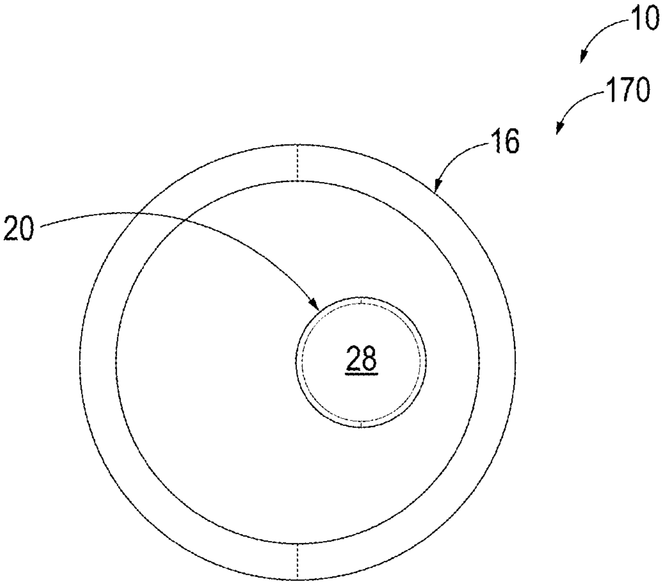
FIG. 23 is a top view of the example apparatus of FIG. 19.
Figure 24:
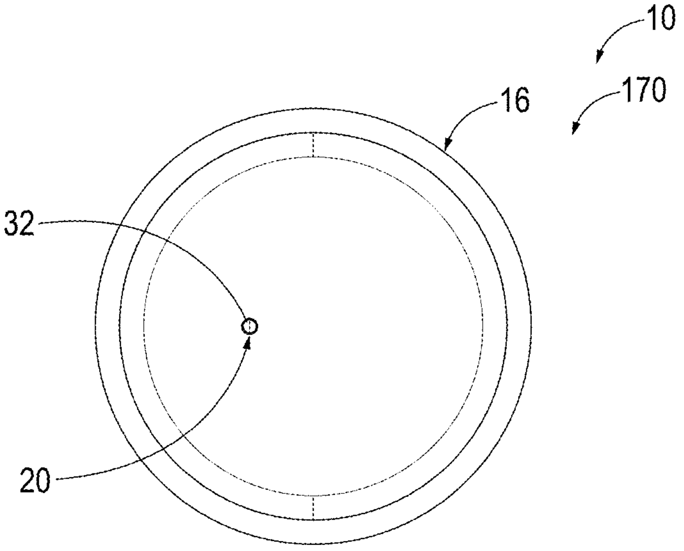
FIG. 24 is a bottom view of the example apparatus of FIG. 19.
Figure 25:
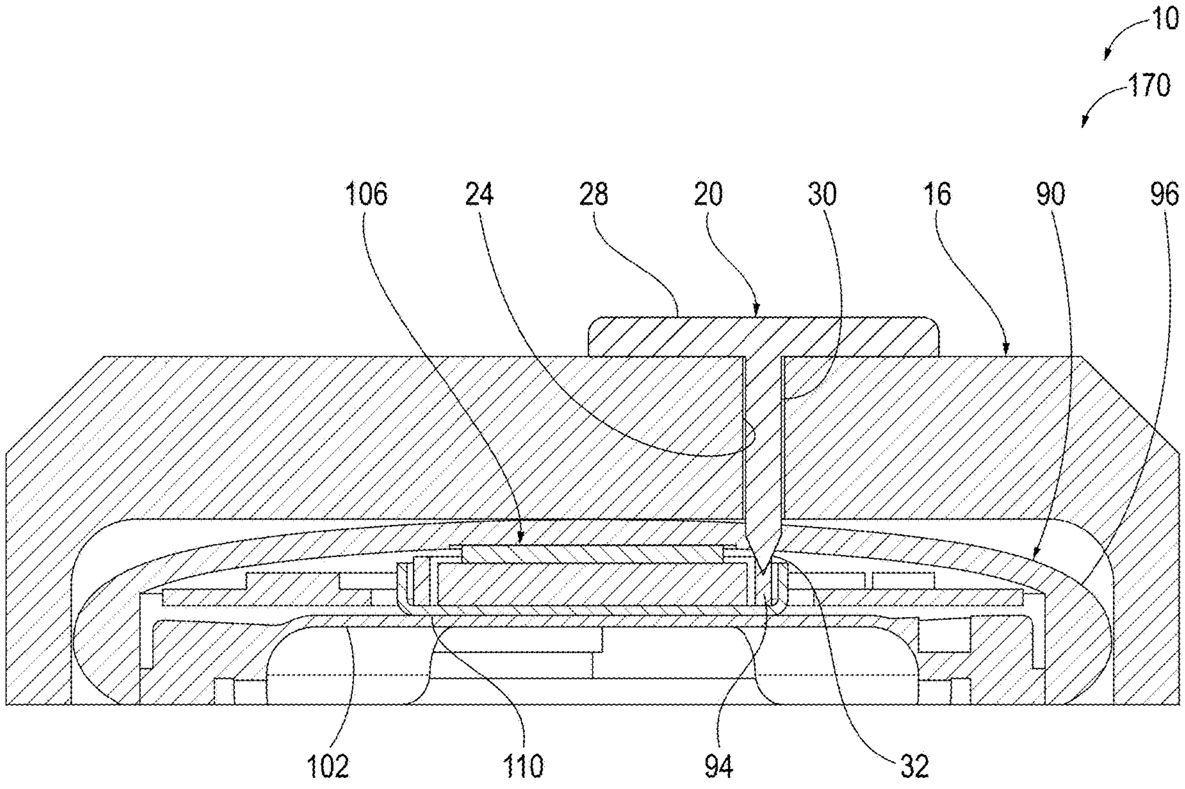
FIG. 25 is a cross-sectional side view of the example apparatus of FIG. 19, together with an Apple™ AirTag™ device operatively received in the volume of the apparatus.
Figure 26:
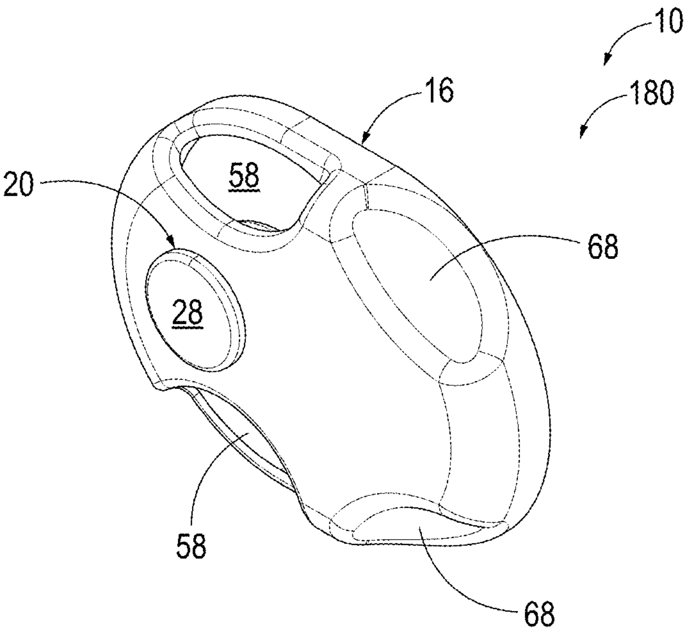
FIG. 26 a top isometric view of another example apparatus according to the present disclosure.
Figure 27:
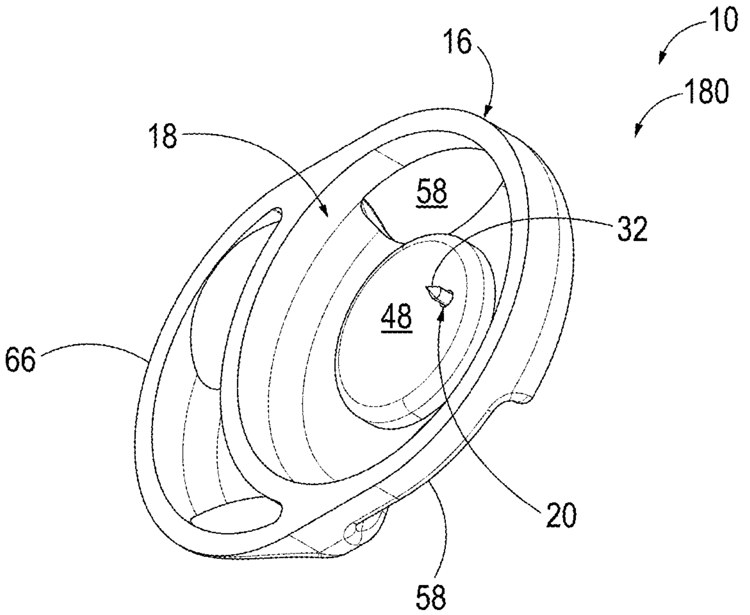
FIG. 27 is a bottom isometric view of the example apparatus of FIG. 26.
Figure 28:
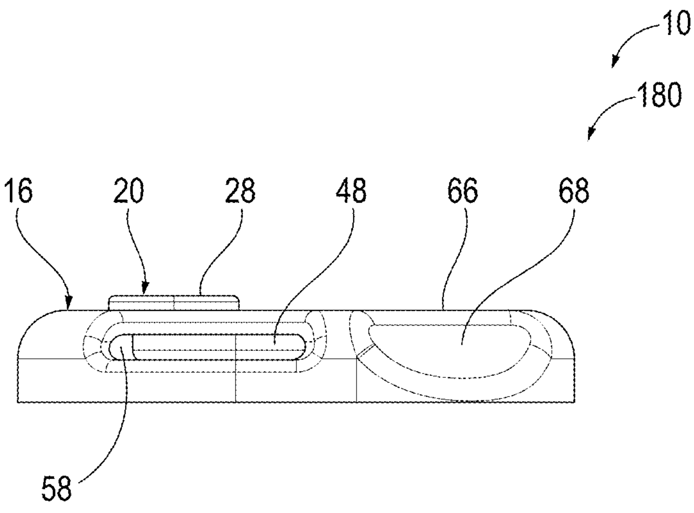
FIG. 28 is a front view of the example apparatus of FIG. 26.
Figure 29:
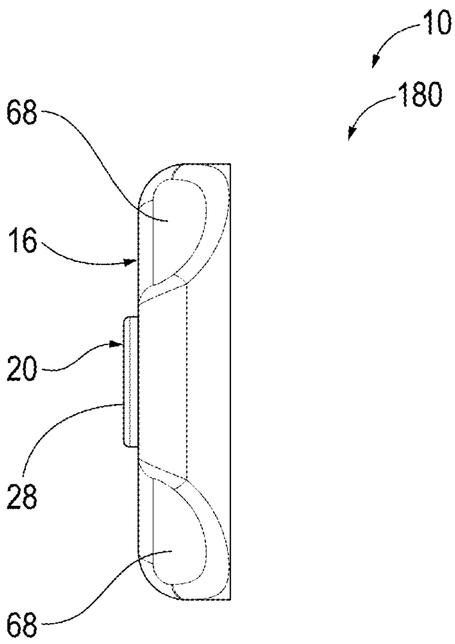
FIG. 29 is a side view of the example apparatus of FIG. 26.
Figure 30:
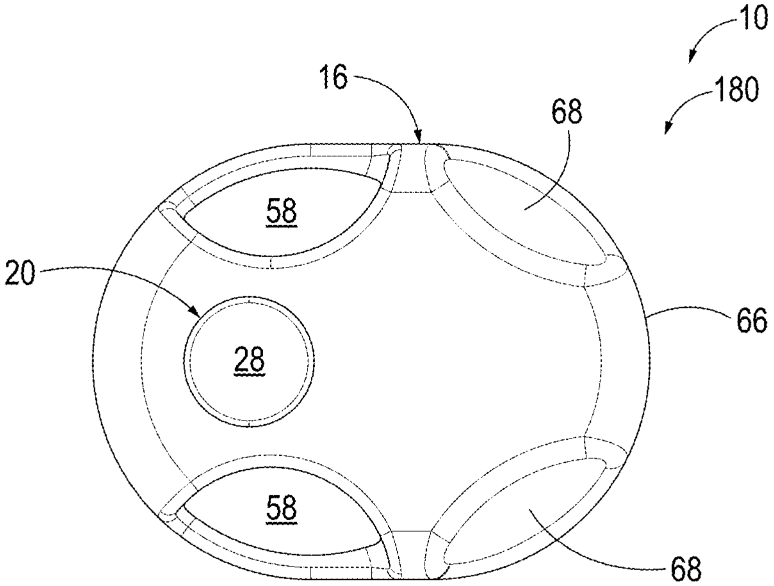
FIG. 30 is a top view of the example apparatus of FIG. 26.
Figure 31:
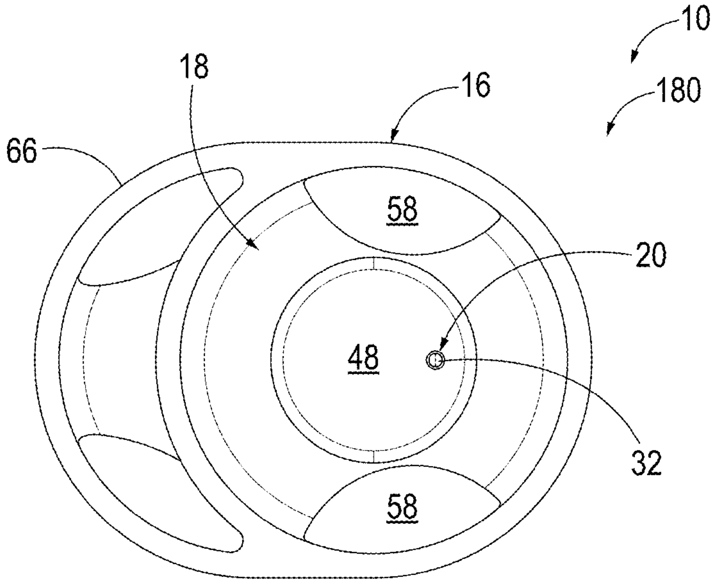
FIG. 31 is a bottom view of the example apparatus of FIG. 26.

FIGS. 12-18 illustrate example apparatus 160, which also is an example of an apparatus 10 that is configured for use with an Apple™ AirTag™ device 90. Apparatus 160 is similar to apparatus 150, but the body 16 of apparatus 160 does not comprises flanges 56 or define openings 58. As with apparatus 150 and as seen in FIG. 18, the terminal end 32 of the piercer 20 of apparatus 160 is positioned to pierce the inner wall 102 and the protective cover 110 of the Apple™ AirTag™ device 90 and to critically damage the speaker coil 94 of the speaker 106 of the Apple™ AirTag™ device 90.

FIGS. 19-25 illustrate example apparatus 170, which also is an example of an apparatus 10 that is configured for use with an Apple™ AirTag™ device 90. However unlike apparatuses 150 and 160, apparatus 170 is configured to receive an Apple™ AirTag™ device 90 in an opposite orientation, that is with the piercer 20 configured to pierce the outer shell 96 to critically damage the speaker coil 94 of the speaker 12 of the Apple™ AirTag™ device 90. Such a configuration avoids having to pierce the inner wall 102 and the protective cover 110; however, piercing the outer shell 96 eliminates any water proofness of the Apple™ AirTag™ device 90. In contrast, apparatuses 10 that are configured to pierce via the battery compartment 100 of an Apple™ AirTag™ device 90 (or other configuration of wireless tracking device 14) will not necessarily effect the water proofness of the device.

Figure 32:
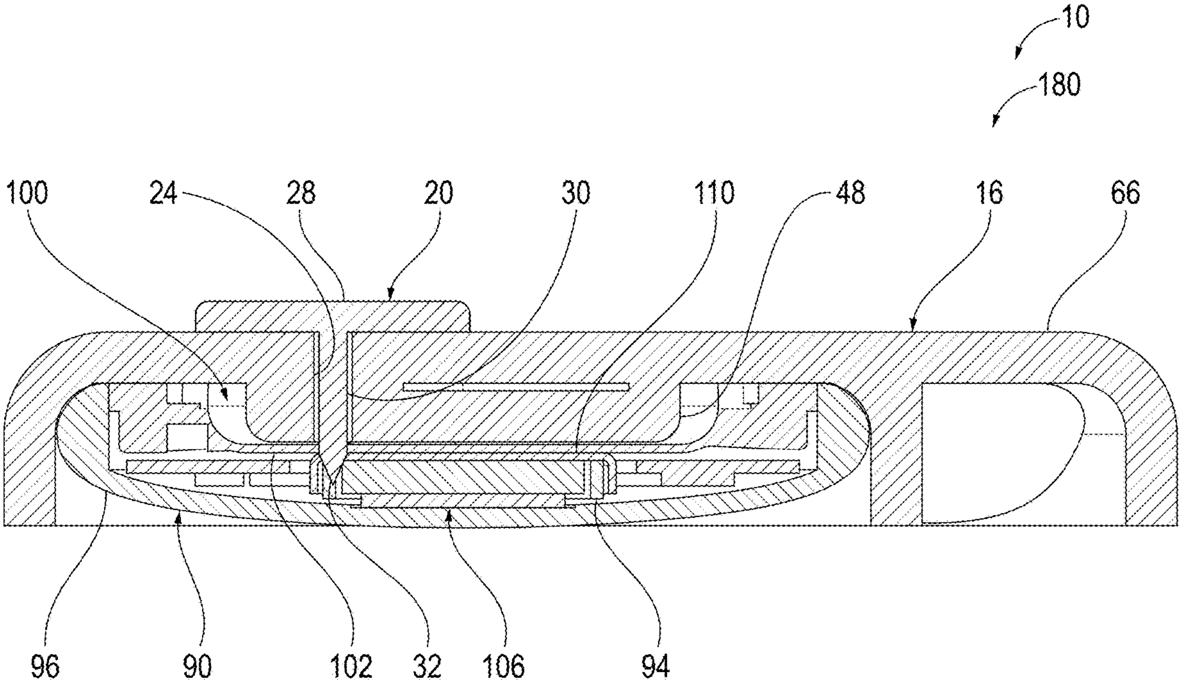
FIG. 32 is a cross-sectional side view of the example apparatus of FIG. 26, together with an Apple™ AirTag™ device operatively received in the volume of the apparatus.

FIGS. 26-32 illustrate example apparatus 180, which also is an example of an apparatus 10 that is configured for use with an Apple™ AirTag™ device 90. The body 16 of apparatus 180 comprises a hollow extension 66 that defines two finger depressions 68. The body 16 also defines two openings 58 similar to apparatus 150. Like apparatuses 150 and 160, the body 16 of apparatus 180 also comprises a projection 48 for extending into the battery compartment 100 of an Apple™ AirTag™ device 90. The piercer 20 of apparatus 180 comprises a head 28 and an elongate shaft 30 that extends through a passage 24 extending through the body 16, including the projection 48 thereof. As seen in FIG. 32, the terminal end 32 of the piercer 20 is positioned to pierce the inner wall 102 and the protective cover 110 of the Apple™ AirTag™ device 90 and to critically damage the speaker coil 94 of the speaker 106 of the Apple™ AirTag™ device 90.

Figure 33:
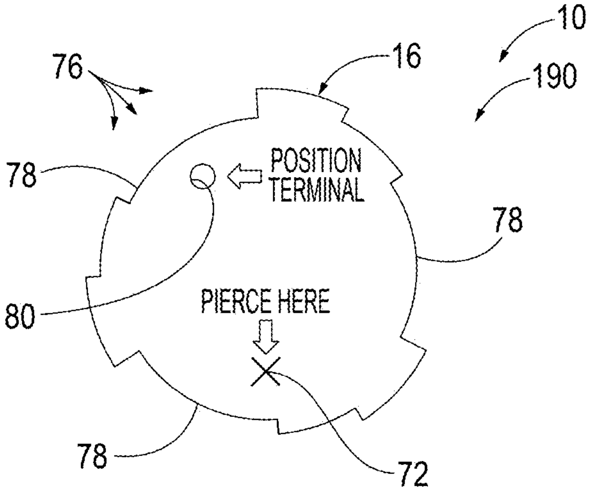
FIG. 33 is a top view of another example apparatus according to the present disclosure.
Figure 34:
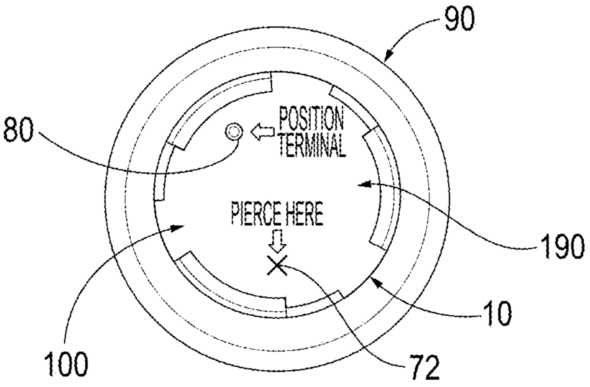
FIG. 34 is a top view of the example apparatus of FIG. 33 operatively engaged with an Apple™ AirTag™ device.
Figure 35:
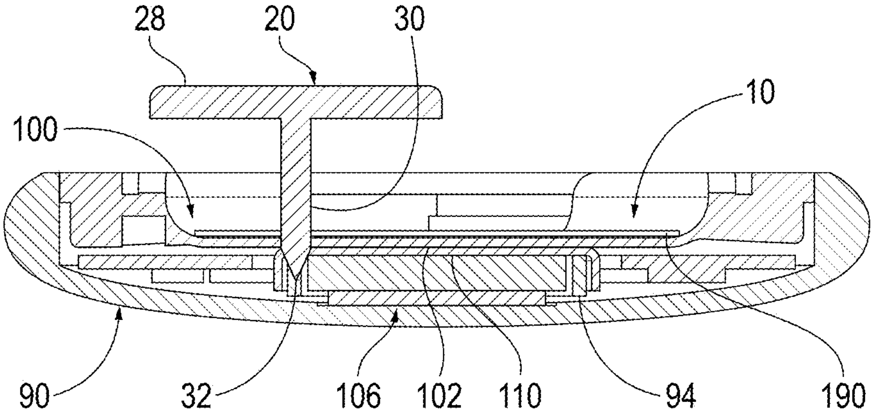
FIG. 35 is a cross-sectional side view of the example apparatus and the Apple™ AirTag™ device of FIG. 34.

FIGS. 33-35 illustrate example apparatus 190. Apparatus 190 is yet another example of an apparatus 10 configured for use with an Apple™ AirTag™ device 90. However, unlike apparatuses 150, 160, 170, and 180, the body 16 of apparatus 190 does not define a volume for operatively receiving a wireless tracking device 14. Rather, the body 16 of apparatus 190 merely is configured to operatively engage an Apple™ AirTag™ device 90 within the batter compartment thereof, as shown in FIG. 34. The body 16 of apparatus 190 comprises piercing indicia 72 in the form of an X, designating where to pierce the body 16 when it is operatively engaged with an Apple™ AirTag™ device 90 for damaging the speaker coil 94 thereof. As seen in FIGS. 33 and 34, the body 16 of apparatus 190 comprises a plurality of alignment features 76, including three recesses 78 that are configured to align with the threads within the battery compartment 100 of an Apple™ AirTag™ device 90, and a hole 80 that is configured to align with (i.e., receive) a battery terminal within the battery compartment 100 of an Apple™ AirTag™ device 90. Apparatus 190 also comprises instructional indicia directing a user how to use apparatus 190. FIGS. 34 and 35 illustrate apparatus 190 in-use, including in FIG. 35 with a piercer 20 having pierced the apparatus 190 through the piercing indicia 72, through the inner wall 102 and the protective cover 110 of the Apple™ AirTag™ device 90 and critically damaging the speaker coil 94 of the speaker 106 of the Apple™ AirTag™ device 90. Illustrative, non-exclusive examples of inventive subject matter according to the present disclosure are described in the following enumerated paragraphs:

A. An apparatus (10) for deactivating a speaker (12) of a wireless tracking device (14), the apparatus (10) comprising:
a body (16) configured to engage the wireless tracking device (14).

A1. The apparatus (10) of paragraph A,
wherein the body (16) defines a volume (18) configured to at least partially receive the wireless tracking device (14) in a close-fit relationship; and
wherein:
the apparatus (10) further comprises a piercer (20) operatively coupled to the body (16) and extending into the volume (18) to align with a critical element (22) of the speaker (12) when the wireless tracking device (14) is operatively received in the volume (18); and/or
the body (16) defines a passage (24) that is aligned with the critical element (22) of the speaker (12) when the wireless tracking device (14) is operatively received in the volume (18), wherein:
the piercer (20) extends through the passage (24) to extend into the volume (18) to align with the critical element (22) of the speaker (12) when the wireless tracking device (14) is operatively received in the volume (18); or
the passage (24) is configured to receive a piercer (20) that is configured to slidingly extend through the passage (24) and into the volume (18) to align with the critical element (22) of the speaker (12) when the wireless tracking device (14) is operatively received in the volume (18).

A1.1. The apparatus (10) of paragraph A1, wherein the body (16) defines the passage (24), and wherein the passage (24) is configured to receive the piercer (20).

A1.1.1. The apparatus (10) of paragraph A1.1, wherein the apparatus (10) further comprises the piercer (20).

A1.1.1.1. The apparatus (10) of paragraph A1.1.1, wherein the piercer (20) comprises a head (28) and an elongate shaft (30) having a terminal end (32) opposite the head (28), and wherein the head (28) is configured to receive an impact force (34) to cause the terminal end (32) to damage the critical element (22) of the speaker (12) when the wireless tracking device (14) is operatively received in the volume (18).

A1.1.2. The apparatus (10) of any of paragraphs A11.-A1.1.1.1, wherein the body (16) is constructed of a body material (40), and wherein the piercer (20) is constructed of a piercer material (42) that is harder than the body material (40).

A1.2. The apparatus (10) of paragraph A1, wherein the apparatus (10) further comprises the piercer (20).

A1.2.1. The apparatus (10) of paragraph A1.2, wherein the piercer (20) is fixed relative to the volume (18).

A1.2.1.1. The apparatus (10) of paragraph A1.2.1, wherein the body (16) comprises an impact zone (36) aligned with the critical element (22) of the speaker (12) when the wireless tracking device (14) is operatively received in the volume (18), and wherein the impact zone (36) is configured to receive an impact force (34) to cause the piercer (20) to damage the critical element (22) of the speaker (12) when the wireless tracking device (14) is operatively received in the volume (18).

A1.2.1.1.1. The apparatus (10) of paragraph A1.2.1.1, wherein the impact zone (36) is defined by indicia.

A1.2.1.1.2. The apparatus (10) of any of paragraphs A1.2.1.1-A1.2.1.1.1, wherein the impact zone (36) is defined by a distinct material from a remainder of the body (16).

A1.2.1.1.2.1. The apparatus (10) of paragraph A1.2.1.1.2, wherein the distinct material is harder than the remainder of the body (16).

A1.2.2. The apparatus (10) of paragraph A1.2, wherein the body (16) defines the passage (24), and wherein the piercer (20) extends through the passage (24).

A1.2.2.1. The apparatus (10) of paragraph A1.2.2, wherein the piercer (20) is slidingly received in the passage (24).

A1.2.2.1.1. The apparatus (10) of paragraph A1.2.2.1, wherein the piercer (20) is restricted from being separated from the body (16).

A1.2.2.2. The apparatus (10) of paragraph A1.2.2, wherein the piercer (20) is fixed relative to the body (16).

A1.2.3. The apparatus (10) of any of paragraphs A1.2-A1.2.2.2, wherein the piercer (20) comprises a head (28) and an elongate shaft (30) having a terminal end (32) opposite the head (28), and wherein the head (28) is configured to receive an impact force (34) to cause the terminal end (32) to damage the critical element (22) of the speaker (12) when the wireless tracking device (14) is operatively received in the volume (18).

A1.2.4. The apparatus (10) of any of paragraphs A1.2-A1.2.3, wherein the body (16) is constructed of a body material (40), and wherein the piercer (20) is constructed of a piercer material (42) that is harder than the body material (40).

A1.3. The apparatus (10) of any of paragraphs A1-A1.2.4, wherein the volume (18) has an at least partially closed top side (44) and an open bottom side (46) opposite the at least partially closed top side (44), wherein the body (16) comprises a top wall (52) that defines the at least partially closed top side (44) of the volume (18) and a sidewall (54) that extends between the top wall (52) and the open bottom side (46) of the volume (18), and wherein the volume (18) is configured to at least partially receive the wireless tracking device (14) via the open bottom side (46).

A1.3.1. The apparatus (10) of paragraph A1.3, wherein the body (16) defines a projection (48) that defines at least a portion of the at least partially closed top side (44), and wherein the projection (48) is configured to extend into a cavity (50) of the wireless tracking device (14) when the wireless tracking device (14) is operatively received in the volume (18).

A1.3.1.1. The apparatus (10) of paragraph A1.3.1, wherein the projection (48) is configured to substantially fill the cavity (50) of the wireless tracking device (14) when the wireless tracking device (14) is operatively received in the volume (18).

A1.3.1.2. The apparatus (10) of any of paragraphs A1.3.1-A1.3.1.1, wherein the piercer (20) extends from the projection (48) into the volume (18), and/or wherein the passage (24) extends through the projection (48).

A1.3.2. The apparatus (10) of any of paragraphs A1.3-A1.3.1.1, wherein the body (16) further comprises one or more flanges (56) extending from the sidewall (54) away from the volume (18) adjacent to the open bottom side (46) of the volume (18).

A1.3.3. The apparatus (10) of any of paragraphs A1.3-A1.3.2, wherein the body (16) defines one or more openings (58) in the top wall (52) and/or in the sidewall (54).

A1.3.3.1. The apparatus (10) of paragraph A1.3.3, wherein the one or more openings (58) are sized to receive a user's finger to engage the wireless tracking device (14) when the wireless tracking device (14) is operatively received in the volume (18) to urge the wireless tracking device (14) out of the volume (18).

A1.3.4. The apparatus (10) of any of paragraphs A1.3-A1.3.3.1, wherein a closest distance (62) between the sidewall (54) and a/the terminal end (32) of the piercer (20) is 10.3-11.3 millimeters (mm) when the terminal end (32) is operatively positioned to damage the critical element (22) of the speaker (12) when the wireless tracking device (14) is operatively received in the volume (18).

A1.3.5. The apparatus (10) of any of paragraphs A1.3-A1.3.4, wherein the body (16) comprises an extension (66) extending away from the sidewall (54) opposite the volume (18).

A1.3.5.1. The apparatus (10) of paragraph A1.3.5, wherein the extension (66) is hollow.

A1.3.5.2. The apparatus (10) of any of paragraphs A1.3.5-A1.3.5.1, wherein the extension (66) defines one or more finger depressions (68) configured to receive one or more respective fingers of a/the user to urge the body (16) against a surface (70).

A1.4. The apparatus (10) of any of paragraphs A-A3.5.2, wherein the volume (18) is configured to at least partially receive the wireless tracking device (14) in a friction-fit relationship.

A1.5. The apparatus (10) of any of paragraphs A-A4, wherein the volume (18) has a circular profile.

A1.6. The apparatus (10) of any of paragraphs A1-A1.5, wherein the volume (18) has a central axis (60).

A1.6.1. The apparatus (10) of paragraph A1.6, wherein a closest distance (64) between the central axis (60) and a/the terminal end (32) of the piercer (20) is 4.8-5.5 millimeters (mm) when the terminal end (32) is operatively positioned to damage the critical element (22) of the speaker (12) when the wireless tracking device (14) is operatively received in the volume (18).

A1.6.2. The apparatus of any of paragraphs A1.6-A1.6.1, wherein the body (16) is radially non-symmetrical about the central axis (60).

A1.6.3. The apparatus of any of paragraphs A1.6-A1.6.1, wherein the body (16) is radially symmetrical about the central axis (60).

A1.7. The apparatus (10) of any of paragraphs A-A6.3, wherein the critical element (22) is a speaker coil (94) of the speaker (12).

A1.8. The apparatus (10) of any of paragraphs A1-A1.7 in combination with the wireless tracking device (14) received at least partially within the volume (18) of the body (16) of the apparatus (10).

A1.8.1. The combination of the apparatus (10) and the wireless tracking device (14) of paragraph A1.8, wherein the piercer (20) extends into the wireless tracking device (14), and wherein the critical element (22) is damaged by the piercer (20).

A2. The apparatus (10) of paragraph A, wherein:

the body (16) comprises piercing indicia (72) positioned to align with a critical element (22) of the speaker (12)

when the body (16) is operatively engaged with the wireless tracking device (14); or the body (16) defines a passage (24) positioned to align with the critical element (22) of the speaker (12) when the body (16) is operatively engaged with the wireless tracking device (14).

A2.1. The apparatus (10) of paragraph A2, wherein the body (16) is configured to adhere to the wireless tracking device (14).

A2.1.1. The apparatus (10) of paragraph A2.1, wherein the body (16) comprises an adhesive (74).

A2.1.2. The apparatus (10) of any of paragraphs A2.1-A2.1.1, wherein the body (16) is constructed of a film material.

A2.1.2.1. The apparatus (10) of paragraph A2.1.2, wherein the body (16) is constructed of a static film material.

A2.1.3. The apparatus (10) of any of paragraphs A2.1-A2.1.2.1, wherein the body (16) is a sticker.

A2.2. The apparatus (10) of any of paragraphs A2-A2.1.3, wherein the body (16) is configured to operatively engage the wireless tracking device (14) within a cavity (50) of the wireless tracking device (14).

A2.3. The apparatus (10) of any of paragraphs A2-A2.2, wherein the body (16) defines one or more alignment features (76) configured to operatively align the body (16) with the wireless tracking device (14) so that the piercing indicia (72) or the passage (24) is operatively aligned with the critical element (22) of the speaker (12) when the body (16) is operatively engaged with the wireless tracking device (14).

A2.3.1. The apparatus (10) of paragraph A2.3, wherein the one or more alignment features (76) comprise one or more recesses (78), one or more holes (80), and/or one or more alignment indicia (82).

A2.4. The apparatus (10) of any of paragraphs A2-A2.3.1, wherein the body (16) has a central axis (60), and wherein a closest distance (64) between the central axis (60) and a center of the piercing indicia (72) or a center of the passage (24) is 4.8-5.5 millimeters (mm).

A2.5. The apparatus (10) of any of paragraphs A2-A2.4, further comprising a piercer (20) configured to pierce the wireless tracking device (14) through the piercing indicia (72) or the passage (24), A2.6. The apparatus (10) of any of paragraphs A2-A2.5 in combination with the wireless tracking device (14), wherein the apparatus (10) is operatively engaged with the wireless tracking device (14) so that the piercing indicia (72) or the passage (24) is aligned with the critical element (22) of the speaker (12) of the wireless tracking device (14).

A3. The apparatus (10) or combination of any of paragraphs A-A2.6, wherein the wireless tracking device (14) is an Apple™ AirTag™ device (90).

B. A method (120) comprising breaking (122) a critical element (22) of a speaker (12) of a wireless tracking device (14).

B1. The method (120) of paragraph B, further comprising penetrating (124) a housing (92) of the wireless tracking device (14), wherein the penetrating (124) results in the breaking (122).

B1.1. The method (120) of paragraph B1, wherein the penetrating (124) comprises urging (126) a piercer (20) through the housing (92).

B1.1.1. The method (120) of paragraph B1.1., wherein the urging (126) comprises hammering (128) the piercer (20).

B2. The method (120) of any of paragraphs B-B1.1.1, wherein the critical element (22) is a speaker coil (94) of the speaker (12).

B3. The method (120) of any of paragraphs B-B2, further comprising retaining (130) the wireless tracking device (14) while performing the breaking (122).

B3.1. The method (120) of paragraph B3 when depending from paragraph B1, wherein the retaining (130) is performed while performing the penetrating (124).

B3.2. The method (120) of any of paragraphs B3-B3.1, wherein the retaining (130) is performed with the apparatus (10) of any of paragraphs A1-A1.8.1.

B4. The method (120) of any of paragraphs B-B3.2, further comprising placing (132) the body (16) of the apparatus (10) of any of paragraphs A2-A2.5 into operative engagement with the wireless tracking device (14) prior to the breaking (122).

B5. The method (120) of any of paragraphs B-B4, wherein the wireless tracking device (14) is an Apple™ AirTag™ device (90).

C. Use of an apparatus (10) to deactivate a speaker (12) of a wireless tracking device (14).

C1. The use of paragraph C, wherein the apparatus (10) is the apparatus (10) of any of paragraphs A-A3.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An apparatus (10) for deactivating a speaker (12) of a wireless tracking device (14), the apparatus (10) comprising:

a body (16) defining a volume (18) configured to at least partially receive the wireless tracking device (14) in a close-fit relationship; and a piercer (20) operatively coupled to the body (16) and extending into the volume (18) to align with a critical element (22) of the speaker (12) when the wireless tracking device (14) is operatively received in the volume (18).

2. The apparatus (10) of claim 1, wherein the body (16) defines a passage (24) that is aligned with the critical element (22) of the speaker (12) when the wireless tracking device (14) is operatively received in the volume (18); and wherein the piercer (20) extends through the passage (24) to extend into the volume (18) to align with the critical element (22) of the speaker (12) when the wireless tracking device (14) is operatively received in the volume (18).

3. The apparatus (10) of claim 2, wherein the piercer (20) is slidingly received in the passage (24).

4. The apparatus (10) of claim 1, wherein the piercer (20) is restricted from being separated from the body (16).

5. The apparatus (10) of claim 1, wherein the piercer (20) comprises a head (28) and an elongate shaft (30) having a terminal end (32) opposite the head (28), and wherein the head (28) is configured to receive an impact force (34) to cause the terminal end (32) to damage the critical element (22) of the speaker (12) when the wireless tracking device (14) is operatively received in the volume (18).

6. The apparatus (10) of claim 1, wherein the body (16) is constructed of a body material (40), and wherein the piercer (20) is constructed of a piercer material (42) that is harder than the body material (40).

7. The apparatus (10) of claim 1, wherein the piercer (20) is fixed relative to the volume (18).

8. The apparatus (10) of claim 1, wherein the body (16) comprises an impact zone (36) aligned with the critical element (22) of the speaker (12) when the wireless tracking device (14) is operatively received in the volume (18), and wherein the impact zone (36) is configured to receive an impact force (34) to cause the piercer (20) to damage the critical element (22) of the speaker (12) when the wireless tracking device (14) is operatively received in the volume (18).

9. The apparatus (10) of claim 8, wherein the impact zone (36) is defined by indicia.

10. The apparatus (10) of claim 8, wherein the impact zone (36) is defined by a distinct material from a remainder of the body (16), and wherein the distinct material is harder than the remainder of the body (16).

11. The apparatus (10) of claim 1, wherein the volume (18) has an at least partially closed top side (44) and an open bottom side (46) opposite the at least partially closed top side (44), wherein the body (16) comprises a top wall (52) that defines the at least partially closed top side (44) of the volume (18) and a sidewall (54) that extends between the top wall (52) and the open bottom side (46) of the volume (18), and wherein the volume (18) is configured to at least partially receive the wireless tracking device (14) via the open bottom side (46).

12. The apparatus (10) of claim 11, wherein the body (16) defines a projection (48) that defines at least a portion of the at least partially closed top side (44), and wherein the projection (48) is configured to extend into a cavity (50) of the wireless tracking device (14) when the wireless tracking device (14) is operatively received in the volume (18).

13. The apparatus (10) of claim 12, wherein the piercer (20) extends from the projection (48) into the volume (18).

14. The apparatus (10) of claim 11, wherein the body (16) defines one or more openings (58) in the top wall (52) and/or in the sidewall (54), wherein the one or more openings (58) are sized to receive a user's finger to engage the wireless tracking device (14) when the wireless tracking device (14) is operatively received in the volume (18) to urge the wireless tracking device (14) out of the volume (18).

15. The apparatus (10) of claim 11, wherein a closest distance (62) between the sidewall (54) and a terminal end (32) of the piercer (20) is 10.3-11.3 millimeters (mm) when the terminal end (32) is operatively positioned to damage the critical element (22) of the speaker (12) when the wireless tracking device (14) is operatively received in the volume (18).

16. The apparatus (10) of claim 11, wherein the body (16) comprises an extension (66) extending away from the sidewall (54) opposite the volume (18); wherein the extension (66) is hollow; and wherein the extension (66) defines one or more finger depressions (68) configured to receive one or more respective fingers of a user to urge the body (16) against a surface (70).

17. The apparatus (10) of claim 1, wherein the volume (18) has a circular profile.

18. The apparatus (10) of claim 1, wherein the volume (18) has a central axis (60), and wherein a closest distance (64) between the central axis (60) and a terminal end (32) of the piercer (20) is 4.8-5.5 millimeters (mm) when the terminal end (32) is operatively positioned to damage the critical element (22) of the speaker (12) when the wireless tracking device (14) is operatively received in the volume (18).

19. An apparatus (10) for deactivating a speaker (12) of a wireless tracking device (14), the apparatus (10) comprising:

a body (16) defining a volume (18) configured to at least partially receive the wireless tracking device (14) in a close-fit relationship, wherein the body (16) defines a passage (24) that is aligned with a critical element (22) of the speaker (12) when the wireless tracking device (14) is operatively received in the volume (18), and wherein the passage (24) is configured to receive a piercer (20) that is configured to slidingly extend through the passage (24) and into the volume (18) to align with the critical element (22) of the speaker (12) when the wireless tracking device (14) is operatively received in the volume (18).

20. An apparatus (10) for deactivating a speaker (12) of a wireless tracking device (14), the apparatus (10) comprising:

a body (16) configured to engage the wireless tracking device (14) wherein:

the body (16) comprises piercing indicia (72) positioned to align with a critical element (22) of the speaker (12) when the body (16) is operatively engaged with the wireless tracking device (14); or the body (16) defines a passage (24) positioned to align with the critical element (22) of the speaker (12)

when the body (16) is operatively engaged with the wireless tracking device (14).

21. A method (120) of using the apparatus (10) of claim 1 to deactivate the speaker (12) of the wireless tracking device (14), the method (120) comprising:

placing (132) the body (16) of the apparatus (10) into operative engagement with the wireless tracking device (14) to at least partially receive the wireless tracking device (14) in the volume (18) in the close-fit relationship; and urging (126) the piercer (20) to penetrate a housing (92) of the wireless tracking device (14) with the piercer (20) to break the critical element (22) of the speaker (12).

* * * * *